(12) United States Patent
Suishu et al.

(10) Patent No.: US 7,356,640 B2
(45) Date of Patent: Apr. 8, 2008

(54) STORAGE APPARATUS AND STORAGE SYSTEM

(75) Inventors: Kazuhito Suishu, Odawara (JP); Keiichi Kaiya, Hadano (JP); Ryusuke Ito, Odawara (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 11/178,422

(22) Filed: Jul. 12, 2005

(65) Prior Publication Data

US 2006/0248306 A1 Nov. 2, 2006

(30) Foreign Application Priority Data

Apr. 28, 2005 (JP) ............................ 2005-130942

(51) Int. Cl.
*G06F 12/00* (2006.01)

(52) U.S. Cl. ..................... 711/100; 711/112; 711/170

(58) Field of Classification Search ................ None
See application file for complete search history.

(56) References Cited

U.S. PATENT DOCUMENTS

| 6,748,489 B2 * | 6/2004 | Soejima et al. ............. 711/114 |
| 2004/0123180 A1 * | 6/2004 | Soejima et al. ............... 714/5 |
| 2004/0153719 A1 * | 8/2004 | Achiwa et al. ................ 714/5 |
| 2004/0167922 A1 * | 8/2004 | Yanase et al. .............. 707/102 |
| 2004/0210605 A1 * | 10/2004 | Hara et al. .................. 707/200 |

FOREIGN PATENT DOCUMENTS

| JP | 10-508967 | 9/1998 |
| JP | 2004-005370 | 1/2004 |

* cited by examiner

*Primary Examiner*—Jasmine Song
(74) *Attorney, Agent, or Firm*—Mattingly, Stanger, Malur & Brundidge, P.C.

(57) ABSTRACT

The present invention manages the information of storage apparatuses inside a single storage apparatus in an integrated fashion, under a heterogeneous storage environment in which a variety of storage apparatuses are distributed and deployed on a plurality of sub-networks.

A wide-area network comprises a plurality of sub-networks, and a plurality of storage apparatuses are disposed on the respective sub-networks. A storage apparatus, which constitutes the connection source, issues query commands and collects storage information from respective external storage apparatuses based on conditions input from a user. When external resources matching the user-desired conditions are extracted, these external resources are displayed on a management terminal. When the user selects a desired external resource, this external resource is connected to a virtual intermediate volume and provided to a host.

13 Claims, 21 Drawing Sheets

FIG. 5

| | G1 |
|---|---|
| - | SUB-SYSTEM CLASS (SYSTEM TYPE) |
| ● | ENTERPRISE CLASS SYSTEM |
| ○ | MID-RANGE CLASS SYSTEM |
| ○ | ENTRY CLASS SYSTEM |
| ○ | DISREGARD |
| - | DEVICE TYPE |
| ○ | MAGNETIC TAPE |
| ● | MAGNETIC DISK |
| ○ | OPTICAL DISK |
| | : |
| | : |
| ○ | DISREGARD |
| - | VENDOR NAME |
| ○ | VENDOR VA |
| ● | VENDOR VB |
| ○ | VENDOR VC |
| ○ | VENDOR VD |
| ○ | VENDOR VE |
| | : |
| | : |
| ○ | DISREGARD |
| - | STORAGE CAPACITY : [ ]  GIGABYTES OR MORE |
| - | NUMBER OF LUN : [ ]  OR MORE |
| | : |

| EXTERNAL RESOURCE SEARCH CONDITION MANAGEMENT TABLE | | | |
|---|---|---|---|
| ITEM 1 | ITEM 2 | CODE | FLAG |
| SUB-SYSTEM CLASS | ENTERPRISE | 0x80000000 | 1 |
| | MID-RANGE | 0x40000000 | 0 |
| | ENTRY | 0x20000000 | 0 |
| | : | : | |
| | DISREGARD | 0x01000000 | 0 |
| DEVICE TYPE | MAGNETIC DISK | 0x00 | 1 |
| | MAGNETIC TAPE | 0x01 | 0 |
| | OPTICAL DISK | 0x07 | 0 |
| | : | : | 0 |
| | DISREGARD | 0x1F | 0 |
| VENDOR NAME (ASCII CODE) | VENDOR VA | 0x48495441434849 | 0 |
| | VENDOR VB | 0x48562020202020 | 1 |
| | VENDOR VC | 0x45534320202020 | 0 |
| | VENDOR VD | 0x59605420202020 | 0 |
| | VENDOR VE | 0x49425320202020 | 0 |
| | : | : | |
| | DISREGARD | 0x20202020202020 | 0 |
| STORAGE CAPACITY | – | 100 | 1 |
| NUMBER OF LUN | – | 8192 | 1 |

| SUB-SYSTEM CLASS DETERMINATION TABLE | | |
|---|---|---|
| CLASS LEVEL | PERTINENT APPARATUS NAME | ASCII CODE |
| ENTERPRISE | APPARATUS NAME SA | 0x4142434420202020 |
| | APPARATUS NAME SB | 0x4445464720202020 |
| | ⋮ | ⋮ |
| | APPARATUS NAME SN | 0x4849505120202020 |
| MID-RANGE | APPARATUS NAME SD | 0x5253545520202020 |
| | ⋮ | ⋮ |
| | APPARATUS NAME SF | 0x5657585920202020 |
| ENTRY | APPARATUS NAME SJ | 0x6061626320202020 |
| | ⋮ | ⋮ |
| | APPARATUS NAME SL | 0x6465662020202020 |

FIG. 8

EXTERNAL RESOURCE MANAGEMENT DATABASE (T3)

| APPARATUS NUMBER | APPARATUS NAME | VENDOR ID | PRODUCT NUMBER | NUMBER OF LUN | LUN NUMBER | WWN | DEVICE TYPE | SIZE |
|---|---|---|---|---|---|---|---|---|
| 12345 | NAME_a | 11 | 12345-1 | m | 1 | WWN11 | DISK | SV1 |
| | | | | | ... | ... | DISK | SV1 |
| | | | | | m | WWNm | DISK | SV2 |
| ... | | | | | | | | |
| 7890 | NAME_z | 99 | 7890-5 | n | 1 | WWN99 | DISK | SV1 |
| | | | | | ... | ... | DISK | SV2 |
| | | | | | n | WWNn | DISK | SV3 |

FIG. 9

EXTERNAL VOLUME CONNECTION MANAGEMENT TABLE — T4

| VDEV NUMBER | DEVICE TYPE | SIZE | WWN | LUN NUMBER | APPARATUS NUMBER | VENDOR ID |
|---|---|---|---|---|---|---|
| 0 | DISK | 65,5000 | 0x50060E8004F12345 | 1 | 12345 | 11 |
| 1 | DISK | 5,542,220 | 0x50060ABCD1F67890 | 3 | 24680 | 21 |
| 2 | DISK | 655,000 | 0x50060E8004F12345 | 5 | 12345 | 11 |
| 3 | DISK | 5,542,220 | 0x50060ABCD1F67890 | 2 | 24680 | 21 |
| 4 | DISK | 16,384 | 0x50060ABAB3F02468 | 4 | 30003 | 30 |
| .. | .. | .. | .. | .. | .. | .. |
| 255 | DISK | 47,476 | 0x50060E8004F12345 | 255 | 12345 | 11 |

FIG. 10

EXTERNAL STORAGE (EXTERNAL VOLUME) RESPONSE PERFORMANCE MANAGEMENT TABLE T5

| APPARATUS NUMBER | VENDOR ID | NUMBER OF LUN | RESPONSE TIME INTEGRATED VALUE | NUMBER OF COMMANDS ISSUED | RESPONSE TIME THRESHOLD VALUE |
|---|---|---|---|---|---|
| 12345 | 11 | 65526 | 120 | 10 | 10 |
| 24680 | 21 | 8192 | 90 | 10 | 10 |
| .. | .. | .. | .. | .. | .. |
| 30003 | 30 | 16384 | 100 | 10 | 10 |

STORAGE APPARATUS AND STORAGE SYSTEM

CROSS-REFERENCE TO RELATED APPLICATIONS

This application relates to and claims priority from Japanese Patent Application No. 2005-130942 filed on Apr. 28, 2005, the entire disclosure of which is incorporated herein by reference.

BACKGROUND OF THE INVENTION

1. Field of the Invention

The present invention relates to storage apparatus and a storage system.

2. Description of the Related Art

For example, due to the large volumes of various types of data that they handle, government organizations, private companies, educational institutions and the like utilize relatively large-scale storage systems to manage data. These storage systems are constituted comprising, for example, disk arrays and other such storage apparatus. For example, a storage apparatus is constituted by arranging a large number of storage devices in an array, and providing a storage area based on RAID (Redundant Array of Inexpensive Disks). At least one logical volume is formed on a physical storage area provided by a group of storage devices, and this logical volume is provided to a host computer (hereinafter referred to simply as "host"). A host can write and read data to and from a logical volume by sending a write command or a read command.

The data that companies and the like must manage is increasingly daily. For this reason, companies, for example, are expanding storage systems by deploying new storage apparatus in the storage systems. Two methods for introducing new-model storage apparatus into a storage system can be cited. One is a method whereby an old-model storage apparatus are replaced with a new-model storage apparatus (Domestic Announcement 10-508967). The other one is a method whereby the old-model storage apparatus are used in combination with new-model storage apparatus.

However, when converting completely from an old-model storage apparatus to a new-model storage apparatus, it is not possible to put the old-model storage apparatus to practical use. By contrast, when an attempt is made to use the old-model storage apparatus in combination with new-model storage apparatus, the constitution of the storage system is made more complex, requiring greater time and effort to manage and operate the system.

Accordingly, technology constituted such that a host is connected to a first storage apparatus, and, in addition, the first storage apparatus is also connected to a second storage apparatus, and the first storage apparatus processes access requests from the host by proxy, is also well known (Japanese Patent Laid-open No. 2004-005370). In this technology, the first storage apparatus also receives and processes commands destined for the second storage apparatus. When necessary, the first storage apparatus issues a command to the second storage apparatus, receives those processing results, and transmits them to the host.

The storage resources of an old model storage apparatus can be effectively utilized by connecting a first storage apparatus and a second storage apparatus in series such that the first storage apparatus receives access requests from a host as disclosed in the above-mentioned literature.

However, in recent years, consideration has also been given to constructing wider area storage networks by interlinking a plurality of sub-networks comprising various storage apparatus. In a wide area storage system such as this, a large number of diverse types of storage apparatus are readily intermixed, forming what is called a heterogeneous storage environment. Under a heterogeneous storage environment, the management and operation of the respective storage apparatus takes time and effort.

SUMMARY OF THE INVENTION

With the foregoing in view, it is an object of the present invention to provide storage apparatus and a storage system constituted such that a desired storage apparatus can be selected relatively easily, and a plurality of storage apparatuses can be utilized by linking them together. Another object of the present invention is to provide storage apparatus and a storage system constituted such that a desired storage apparatus can be relatively easily detected and utilized under a heterogeneous environment in which a variety of storage apparatuses are intermixed. Yet another object of the present invention will become clear from the disclosure of the aspects of the embodiment described hereinbelow.

In order to solve for the above problems, a storage apparatus in accordance with the present invention is a storage apparatus capable of being connected to a plurality of other storage apparatuses, respectively, by way of a communications network, and is characterized in that it comprises a storage information manager for managing storage information related to the respective other storage apparatus; an intermediate volume connected to a logical volume; an extractor, which, based on input extraction conditions, extracts from among the other storage apparatuses a prescribed storage apparatus matching extraction conditions by retrieving various storage information managed by the storage information manager; a presentation portion for showing a prescribed storage apparatus extracted by the extractor; and a connection controller for connecting a storage device belonging to a prescribed storage apparatus, to an intermediate volume, and connecting the intermediate volume to a logical volume when a prescribed storage apparatus shown by the presentation portion is selected.

A communications network can comprise a plurality of sub-networks. The above-mentioned storage apparatus can be disposed on any one of these sub-networks, and at least one of the respective other storage apparatuses can be disposed on other sub-networks.

The storage information manager can acquire and manage respective storage information from other storage apparatus by issuing query commands to each of the other storage apparatus, respectively.

When an extraction condition has been input, the storage information manager makes a determination as to whether or not the acquisition of storage information is complete, and when it determines that there is storage information that has not been acquired, it can acquire and manage respective storage information from other storage apparatus by issuing query commands to the other storage apparatus, respectively.

When the storage information manager detects configuration changes in other storage apparatus, it can also acquire storage information from other storage apparatus involved in a configuration change by issuing query commands to the other storage apparatus involved in this configuration change.

The storage information manager can also detect and manage the response state of other storage apparatus relative to a query command.

The storage information manager is capable of issuing a query command corresponding to an extraction condition. Issuing a query command corresponding to an extraction condition means issuing a query command corresponding to attributes targeted for acquisition in order to acquire from other storage apparatus the attributes comprising an extraction condition. If SCSI commands are given as an example, these would be commands like the Inquiry command, ReadCapacity command, ReportLUN command and TestUnit Ready command.

An extraction condition can be comprised of any one or more of the types of classes to which other storage apparatus belongs, the classifications of storage devices of other storage apparatus, the vendor names of other storage apparatus, and the free space of other storage apparatus.

When a plurality of prescribed storage apparatuses are detected, the presentation portion can show all of them. An extraction condition is used to extract a storage apparatus comprising a desired configuration (a prescribed storage apparatus). An extraction condition is comprised of one or a plurality of user-desired attributes.

Therefore, other storage apparatus comprising a specified attribute are all extracted, and become candidate storage apparatus to be selected by a user. Thus, a plurality of prescribed storage apparatuses, which become candidates, can be extracted without directly specifying a specific storage apparatus. Therefore, the presentation portion shows the user all of the prescribed storage apparatuses that have been extracted.

The connection controller is capable of connecting a storage device and a logical volume by way of an intermediate volume so as to allocate a physical storage area having storage devices to a logical volume via an intermediate volume.

In other words, a storage space having a logical volume is allocated to a physical storage area of storage devices by way of a storage space having an intermediate volume. When carrying out data input-output by specifying addresses in the storage space of a logical volume, these addresses are converted to addresses of the physical storage area of a storage device via the storage space of the intermediate volume.

The storage information manager can detect and manage the response state of other storage apparatus relative to a query command. Then, the connection controller can control the transfer mode between a storage device and a logical volume, which a prescribed storage apparatus possesses, based on the response state of the other storage apparatus managed by the storage information manager.

The connection controller can select an asynchronous transfer mode when the response time from a selected prescribed storage apparatus is greater than a predetermined standard time, and it can select a synchronous mode when the response time from a selected prescribed storage apparatus is less than a predetermined standard time.

When writing data to a logical volume, the asynchronous transfer mode is the mode, which reports write-complete prior to the data being written to a location corresponding to a storage device. When writing data to a logical volume, the synchronous transfer mode is the mode, which reports write-complete after confirming that the data has been written to a location corresponding to a storage device.

The connection controller can prohibit the use of a storage device by other storage apparatus when a storage device and a logical volume are connected via an intermediate volume. For example, setting the access attributes of a storage device such that it does not respond to a query command from another storage apparatus can be considered as a method for prohibiting the use of a storage device. Another method that can be considered is one in which, for example, information indicating that the storage device is already being utilized is communicated to other storage apparatus.

A storage system in accordance with a different viewpoint of the present invention is a storage system comprising a plurality of sub-networks each having at least one storage apparatus, and at least one of these storage apparatuses comprising a controller having a communications port for communicating with the other storage apparatus, respectively, via the sub-network; memory, which is utilized by the controller; a connection control table, which is stored in the memory; a logical volume, which is generated by the controller; and an intermediate volume, which is generated by the controller, and which is logically connected to the logical volume by the connection control table. Now then, the controller comprises a storage information manager, which acquires storage information related to the respective other storage apparatus, and which manages this acquired storage information by storing it in memory; an extractor, which, based on an extraction condition input from a management terminal connected to the controller, extracts from among the respective other storage apparatus a prescribed storage apparatus matching the extraction condition by retrieving the respective storage information managed by the storage information manager; a presentation portion for showing a prescribed storage apparatus extracted by the extractor via a management terminal; and a connection controller for connecting a storage device, which is of a prescribed storage apparatus, to a logical volume by way of an intermediate volume by updating the registration contents of the connection control table when a prescribed storage apparatus shown by the presentation portion is selected via a management terminal.

In addition, the controller is capable of communicating with a host system via another communication port, and a communications network for connecting the other communication port to a host system can be constructed independently of the communications network to which the other storage apparatus are connected. That is, a communications network between the controller and a host system, and a communications network between the controller and the other storage apparatus can be configured independently of one another. This means the communications between the controller and the other storage apparatus will not affect the communications network between the controller and a host system, and it will make it possible to manage a plurality of other storage apparatuses while ensuring responsiveness toward a host system.

A storage system management method in accordance with a different viewpoint of the present invention is a method for managing a storage system comprising a plurality of types of storage apparatuses intermixed on a network via a storage apparatus comprising management functions, and the management function-equipped storage apparatus executes each of the steps of receiving an extraction condition input; determining whether or not a database has been generated for managing the storage information of the storage apparatus when an extraction condition is input; acquiring storage information respectively from the storage apparatus by issuing a query command, and generating a database when a database has not been created; extracting a prescribed storage apparatus matching an extraction condition by searching the database on the basis of the extraction condition; presenting the prescribed storage apparatus that has been extracted; determining whether or not the prescribed storage apparatus that was presented has been selected; logically connecting a storage device of the prescribed storage apparatus to a logical volume of the management function-equipped storage apparatus, via an intermediate volume belonging to the management function-equipped storage apparatus when the prescribed storage apparatus has been selected; and updating the database when configuration changes of the storage apparatus are detected by acquiring the storage information of the storage apparatus involved in these configuration changes.

There will be cases when all or part of the means, functions and steps of the present invention can be configured as a computer program to be executed by a computer system. When all or part of the constitution of the present invention is constituted from a computer program, this computer program can either be stored on various storage media and disseminated, or it can be sent via a communications network.

BRIEF DESCRIPTION OF THE DRAWINGS

FIG. 5 is a schematic diagram showing a screen for a user to specify desired conditions;

FIG. 6 is a schematic diagram showing the constitution of a table for managing external resource search conditions;

FIG. 7 is a schematic diagram showing the constitution of a table for determining sub-system classes;

FIG. 8 is a schematic diagram showing the constitution of an external resource management database;

FIG. 9 is a schematic diagram showing a connection management table for an external volume;

FIG. 10 is a schematic diagram of a table for managing the response performance of an external storage apparatus;

DESCRIPTION OF THE SPECIFIC EMBODIMENTS

Figure 1:
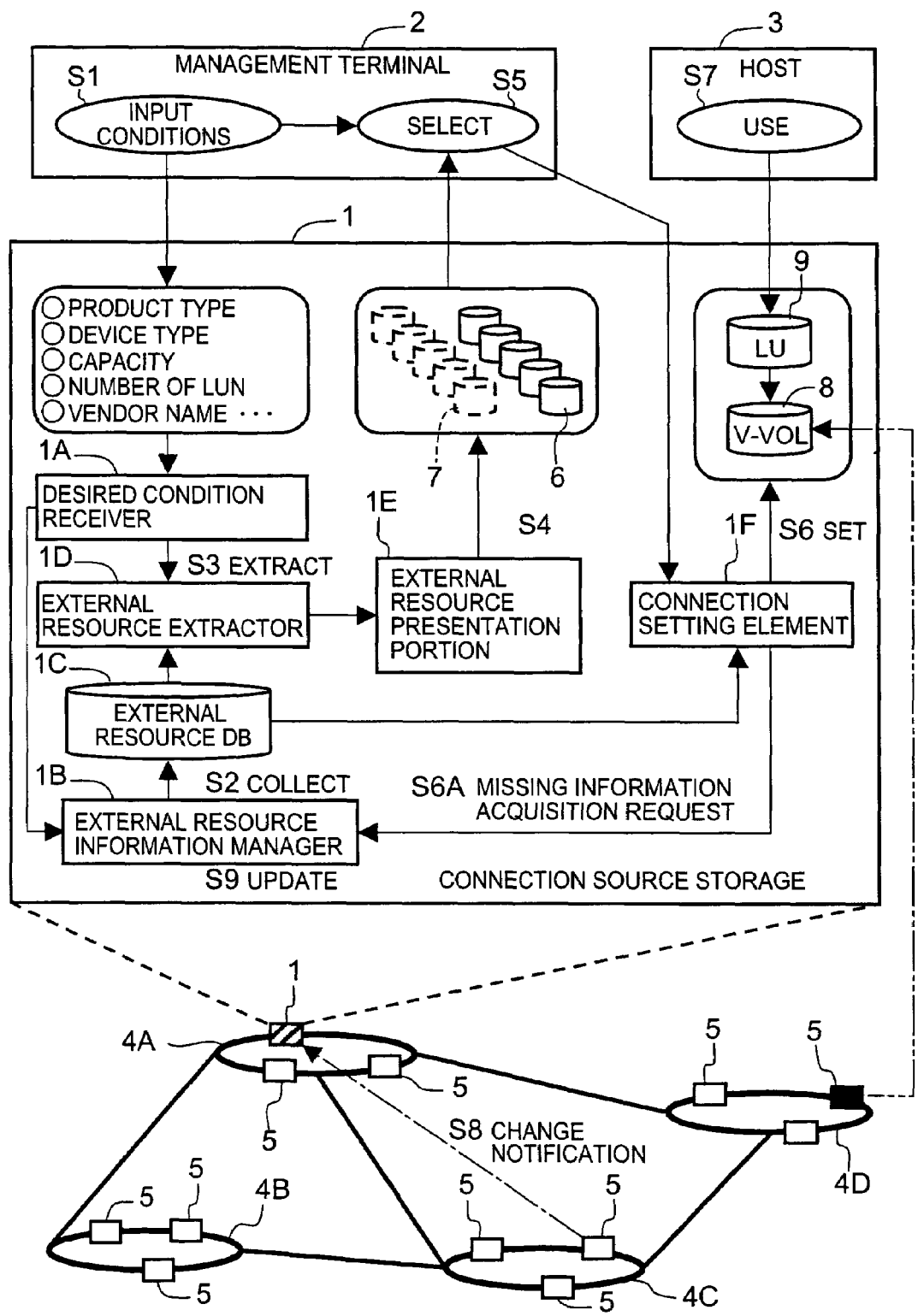
FIG. 1 is a block diagram showing the overall concept of an embodiment of the present invention.

FIG. 1 is a block diagram showing the overall concept of an embodiment of the present invention. As shown in the bottom portion of FIG. 1, this storage system comprises a plurality of sub-networks 4A, 4B, 4C, and 4D. The sub-networks 4A through 4D each comprise either one or a plurality of storage apparatuses 5.

The sub-networks 4A through 4D, for example, are configured as FC-SAN (Fibre Channel-Storage Area Network), IP-SAN (Internet Protocol-SAN), LAN (Local Area Network), or WAN (Wide Area Network). Now then, the sub-networks 4A through 4D are interconnected, for example, via either fibre channels, the Internet, or leased lines. Each of the sub-networks 4A through 4D can also constitute a different network. For example, a network constituted on the basis of FC-SAN and a network constituted on the basis of an IP-SAN can exist together.

A connection-source storage apparatus 1 is disposed in sub-network 4A. The connection-source storage apparatus 1 is constituted such that, by connecting to another storage apparatus 5 distributed on a network, it can incorporate the storage resources belonging to that storage apparatus 5 as its own storage resources. The connection-source storage apparatus 1 can also be called a main storage apparatus 1.

The connection-source storage apparatus 1 is connected to a management terminal 2 by way of a communications network that differs from the sub-networks 4A through 4D. The connection-source storage apparatus 1 is also connected to a host 3 via a separate communications network.

The connection-source storage apparatus 1, for example, can be constituted comprising a desired condition receiver 1A, an external resource manager 1B, an external resource database (In the figure, database is abbreviated as DB) 1C, an external resource extractor 1D, an external resource presentation portion 1E, and a connection setting portion 1F.

As used here, external resource means a storage resource that exists outside the connection-source storage apparatus 1. More specifically, a storage device belonging to another storage apparatus 5 falls into the category of an external resource. Furthermore, another storage apparatus 5 that exists outside the connection-source storage apparatus 1 can also be called an external storage apparatus 5.

The desired condition receiver 1A receives an external resource-related condition from a user. The user can input desired conditions via the management terminal 2 to the connection-source storage apparatus 1 (S1). The user can specify either one or a plurality of desired attributes, such as, for example, the product classification (enterprise class, mid-range class, or entry class), type of device (disk drive, tape drive, and so forth), vendor name, free space size, and number of LUN (Logical Unit Number). Or, the user can also specify more ambiguous conditions, such as "a storage apparatus having a low-speed storage device," or "a storage apparatus with limited I/O (Input/Output)." The desired conditions input by this user correspond to an "extraction condition."

The external resource information manager 1B collects information related to the configurations of storage apparatus 5 distributed over a network (storage information) by issuing a query command when desired conditions from a user are input (S2). The various collected storage information is registered in the external resource database 1C.

Here, a query command is selected in accordance with the item targeted for collection. For example, when acquiring device type, vendor name and the like, the Inquiry command is used. When acquiring the free space size, the ReadCapacity command is used. When acquiring the number of LUN, the ReportLUN command is used. When ascertaining whether or not the storage apparatus 5 exists, the TestUnitReady command is used. Furthermore, the above is an example of SCSI (Small Computer System Interface) commands, but the present invention is not limited to these commands.

A query command can be issued in accordance with a condition input from a user. For example, when a user desires to extract a "storage apparatus having a disk drive," being able to acquire information related to the existence of a storage apparatus and device types will suffice. Therefore, it is not always necessary to acquire other attributes, such as free space size, which are not included in a desired condition. Only the required query command can be issued as needed.

When the information required for connecting a storage apparatus 5 to a storage apparatus 1 is lacking, the missing information can be acquired by querying only the storage apparatus 5. This makes it possible to shorten extraction time and provide results to a user quickly even at the stage when an external resource database 1C has yet to be constructed.

The external resource extractor 1D searches the external resource database 1C based on a condition specified by a user, and extracts all pertinent storage apparatus 5 (S3). When the user-specified condition is an "enterprise-class storage apparatus," all the enterprise-class storage apparatus among the storage apparatus 5 distributed throughout the sub-networks 4A through 4D will be extracted.

The external resource presentation portion 1E shows the user the results extracted by the external resource extractor 1D (S4). For example, the external resource presentation portion 1E displays extraction results as a list on the management terminal 2 screen. Only the group of external volumes 6 satisfying the user-specified condition is displayed on the screen of the management terminal 2. A group of volumes 7, which does not satisfy any of the user-specified conditions, is not disclosed to the user. In this embodiment, a user's selection is supported by disclosing to the user only the group of external volumes 6 that satisfies all of the specified conditions.

Here, external volume signifies a volume located outside of the connection-source storage apparatus 1. By contrast, internal volume means a volume that exists inside the connection-source storage apparatus 1. Now then, the connection-source storage apparatus 1 can incorporate an external volume as a virtual internal volume.

A user selects one or a plurality of desired external volumes from among the group of external volumes 6 being displayed on the management terminal 2 screen (S5). In the example shown in FIG. 1, a volume belonging to a storage apparatus 5 on sub-network 4D has been selected.

When an external volume is selected by a user, the connection setting portion 1F connects this selected external volume to an LU 9 (S6). The connection setting portion 1F connects the selected external volume to a virtual volume (V-VOL) 8, and connects the virtual volume 8 to the LU 9. The virtual volume 8 corresponds to an "intermediate volume." The virtual volume 8 can also be called a virtual intermediate storage device. LU 9 is a logical volume. In the below explanation, LU 9 is at times called logical volume 9.

More specifically, the connection setting portion 1F associates the path information for accessing the selected external volume to LU 9. The external volume's physical storage area is made to correspond to LU 9 via the virtual volume 8. Furthermore, if, when the connection setting portion 1F performs connection setting, a portion of the information required for this connection setting is not registered in the external resource database 1C, the connection setting portion 1F can request that the external resource manager 1B acquire this missing information (S6A).

When the connection of the external volume and LU 9 is complete, and the path between the host 3 and LU 9 has been established, the host 3 can make use of LU 9 (S7). For example, when the host 3 issues a write command intended for LU 9, this write data is transmitted to the external volume by way of virtual volume 8, and written to a predetermined location of the external volume. In the case of a read command, read data is read out from the external storage apparatus 5 and sent to the host 3.

Furthermore, when read data requested by the host 3 is cached in the connection-source storage apparatus 1, there is no need to read out the data from the external volume. Thus, the host 3 can utilize the logical volume (LU) 9 without being the least bit aware of whether the actual data storage location is internal or external relative to the connection-source storage apparatus 1.

When the configuration of the storage apparatus 5 on a network change, the connection-source storage apparatus 1 receives a status change notification from a storage apparatus 5 whose configuration has been altered (S8). Thus, the external resource information manager 1B issues a query command to the storage apparatus 5, which has undergone a configuration change, and acquires storage information. The external resource information manager 1B updates the external resource database 1C in accordance with the newly acquired storage information (S9).

As described hereinabove, in this embodiment, a user can easily specify a desired storage apparatus 5 from among a plurality of storage apparatuses 5 distributed on the sub-networks 4A through 4D (S1). Then, in this embodiment, all the storage apparatus 5 corresponding to a user's desired conditions can be extracted (S3), and can be displayed for the user (S4). In addition, in this embodiment, in accordance with corresponding an external volume selected by a user (S5) to a logical volume 9 (S6), it is possible for a host 3 to utilize this volume (S7).

A constitution, whereby the storage area of an external volume is connected directly to a logical volume 9 without going through a virtual volume 8 can also be considered here. However, in this case, the performance and ease-of-use of the logical volume 9 will be restricted by the properties and structure of the external volume. For example, when an external volume corresponds directly to a logical volume, if the size of the external volume is 100 MB, the size of the logical volume 9 will also be 100 MB. Similarly, ease-of-use is also degraded due to the fact that the properties and structure of the external volume have a direct impact on the logical volume 9.

By contrast, in this embodiment, because the external volume and the logical volume 9 are connected via a virtual volume 8, the affects of the properties and structure of the external volume can be prevented from directly impacting on the logical volume 9. Since it is also possible to make use of the various functionality and performance afforded by the connection-source storage apparatus 1, ease-of-use is also enhanced. This embodiment will be explained in more detail hereinbelow.

1. First Embodiment

Figure 2:
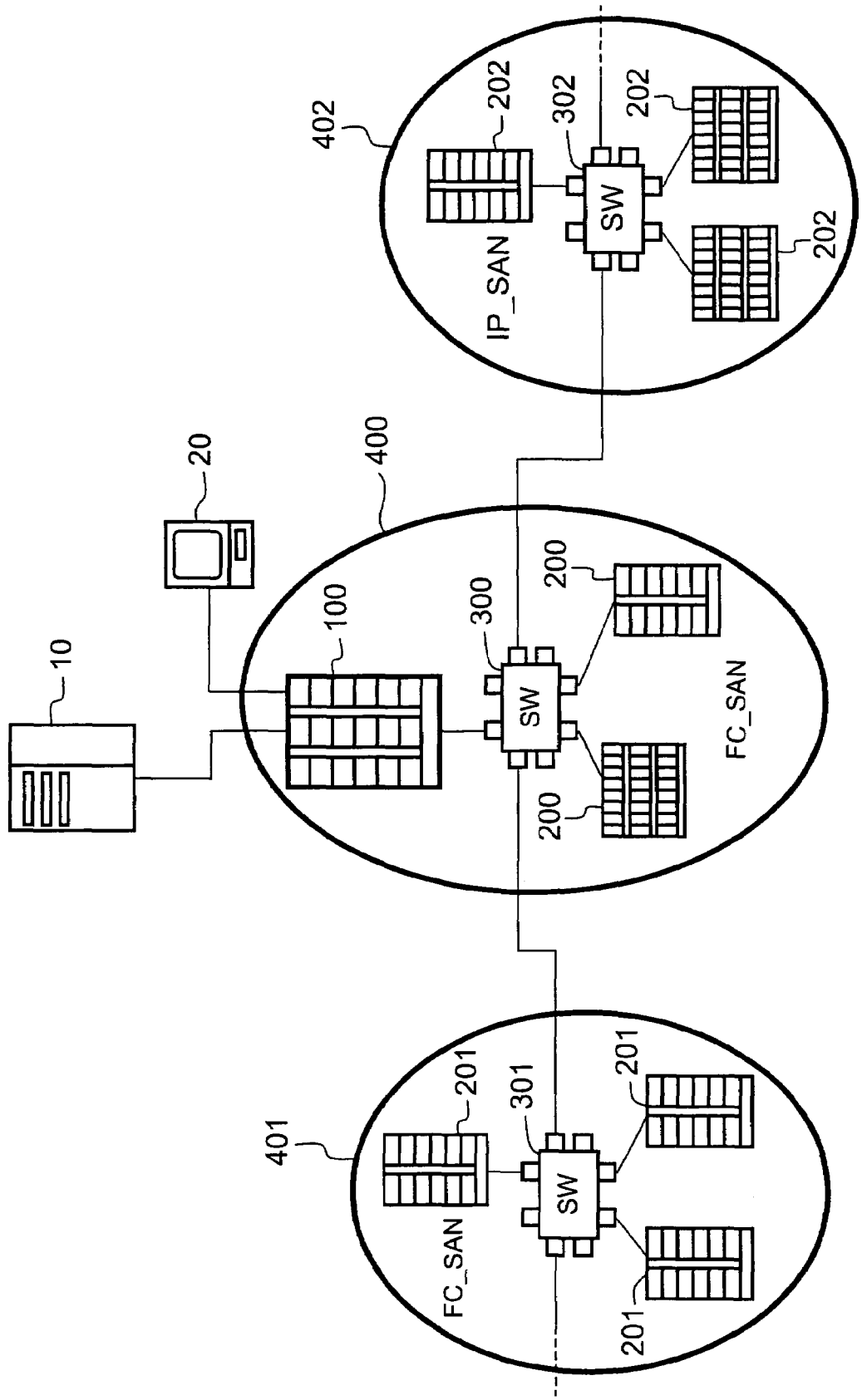
FIG. 2 is a schematic diagram showing a storage system structure.

FIG. 2 is a schematic diagram showing a storage system structure according to this embodiment. In relation to the above FIG. 1, a main storage apparatus 100 in FIG. 2 corresponds to the connection-source storage apparatus 1 in FIG. 1. Similarly, external storage apparatus 200, 201, 202 in FIG. 2 correspond to the storage apparatus 5 in FIG. 1. A host 10 in FIG. 2 corresponds to the host 3 in FIG. 1. A management terminal 20 in FIG. 2 corresponds to the management terminal 2 in FIG. 1. Sub-networks 400, 401, 402 in FIG. 2 correspond to the sub-networks 4A through 4D in FIG. 1. Furthermore, in FIG. 2, only three sub-networks are shown, but the same as in FIG. 1, a storage system can also comprise four or more sub-networks.

A main storage apparatus 100 and a plurality of other storage apparatuses 200, respectively, are disposed in the sub-network 400 shown in the center of FIG. 2. These storage apparatus 100, 200, for example, are interconnected via a switch 300.

Similarly, a plurality of storage apparatuses 201 interconnected via a switch 301 is disposed in the sub-network 401 shown in the left side of FIG. 2. A plurality of storage apparatuses 202 interconnected via a switch 302 is disposed in the sub-network 402 shown in the right side of FIG. 2.

As one example, here, sub-networks 400, 401 are constituted on the basis of FC-SAN, and the other sub-network 402 is constituted on the basis of IP-SAN. Now then, for example, fibre channels, leased lines, switched lines, or the Internet can be used as internetworking networks for connecting the respective sub-networks 400, 401, 402.

Furthermore, in this figure, the detailed constitution of gateways and the like for protocol conversion are omitted for the sake of expediting the explanation. Also, in this figure, the respective switches 300, 301, 302 are shown one at a time, but this embodiment can also comprise a plurality of switches. In addition, the respective sub-networks 400, 401, 402 can also be loop structures.

These sub-networks 400, 401, 402, for example, can also be called a storage domain. As used here, storage domain, for example, can be defined as a unit area from the standpoint of managing a storage network comprising a plurality of storage apparatuses.

For example, a sub-network 400 can be disposed at a headquarters, and other sub-networks 401, 402 can be disposed at branch offices, plants, and so forth. Or, for example, a sub-network 400 can be configured in the information systems division, a sub-network 401 can be configured in the development division, and a sub-network 402 can be disposed in the sales division, respectively.

Figure 3:
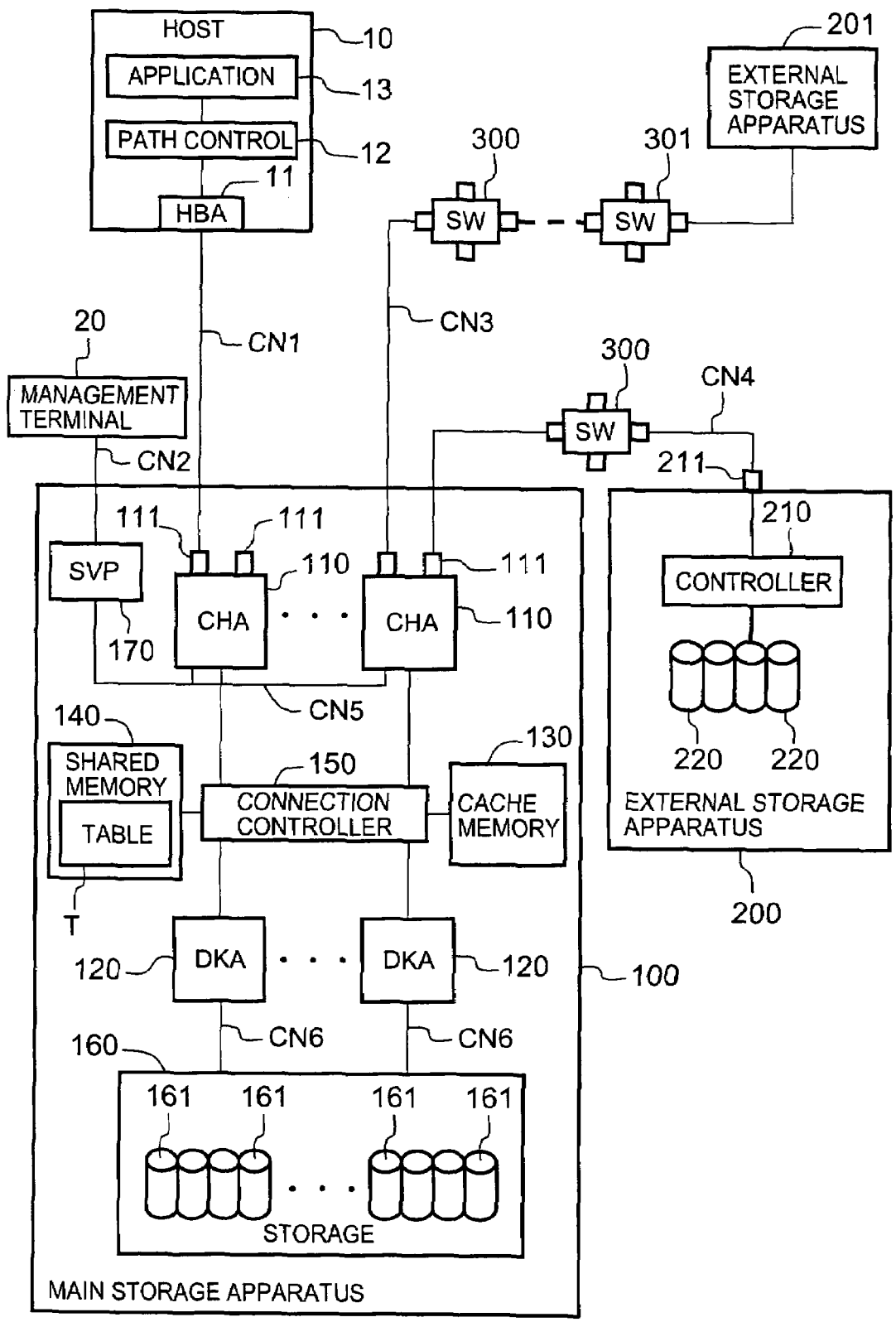
FIG. 3 is a block diagram of a storage system.

FIG. 3 is a block diagram showing the overall constitution of a storage system. A storage system, for example, can be constituted comprising a host 10, management terminal 20, main storage apparatus 100, and external storage apparatus 200, 201, 202 (Refer to FIG. 2 for external storage apparatus 202).

The host 10, for example, is a computer system comprising a CPU (Central Processing Unit), and information processing resources, such as memory and so forth. The host 10, for example, can be constituted as a personal computer, workstation, mainframe or the like. Furthermore, in the figure, only one host 10 is shown, but in reality a plurality of hosts 10 can be provided.

The host 10 can comprise an HBA (Host Bus Adapter) 11, path control program 12, and application program 13 for accessing the main storage apparatus 100 via a communications network CN1.

As the communications network CN1, for example, a LAN (Local Area Network), SAN (Storage Area Network), the Internet, or leased lines can be used as warranted by the situation. In the case of a LAN, for example, data transfer can be performed in accordance with the TCP/IP protocol. In this case, the host 10 will specify a filename, and request data input/output in file units.

When the host 10 is connected to the main storage apparatus 100 via a SAN, the host 10 can carry out data transfer on the basis of the fibre channel protocol. In the case of a SAN, the host 10 will request data input/output to the main storage apparatus 100 in units called blocks, which are the data management units of a disk drive 161.

When the communications network CN1 is a LAN, the HBA 11, for example, is a network card that supports a LAN. By contrast, when the communications network CN1 is a SAN, the HBA 11, for example, is a host bus adapter.

The management terminal 20 is a computer system for managing the configuration of the storage system, and, for example, is operated by users, such as a system administrator or maintenance personnel. The management terminal 20 is connected to the main storage apparatus 100 by way of a communications network CN2.

The main storage apparatus 100, for example, is configures as a disk array subsystem. However, it is not limited to this, and the main storage apparatus 100, for example, can also be configured as a high-functionality switch (a fibre channel switch or the like). The main storage apparatus 100 is connected to the respective external storage apparatus 200, 201, 202 via the switches 300, 301, 302. The main storage apparatus 100, as will be explained hereinbelow, can be provided to the host 10 as a logical volume (Logical Unit) that treats storage resources of external storage apparatus 200, 201, 202 as its own. Therefore, the main storage apparatus 100 does not necessarily have to comprise a real volume.

The main storage apparatus 100 can be broadly divided into a controller and storage 160. The controller, for example, can be constituted comprising a plurality of channel adapters (hereinafter referred to as "CHA") 110, a plurality of disk adapters (hereinafter referred to as "DKA") 120, cache memory 130, shared memory 140, and a connection controller 150.

The respective CHA 110 carry out data communications with the host 10. Each CHA 110 comprises at least one communication port 111 for communicating with the host 10. Each CHA 110 is constituted as a microcomputer system comprising a CPU, memory and so forth. The CHA 110 interpret and execute the various commands, such as a read command or write command, received from the host 10.

A network address (for example, IP address or WWN) for identifying the respective CHA 110 is allocated to each CHA 110, and the respective CHA 110 can also behave like each one is a separate NAS (Network Attached Storage). When there is a plurality of hosts 10, the CHA 110 receive and process requests from each host 10 individually.

The DKA 120 carry out data transfer between disk drives 161 of storage 160. The DKA 120, just like the CHA 110, are configured as microcomputer systems comprising CPU, memory, and the like. Each DKA 120, for example, writes data that CHA 110 receive from a host 10, and data read out from the external storage apparatus 200, 201, 202 to a prescribed disk drive 161. The DKA 120 can also read out data from a prescribed disk drive 161, and send it to either a host 10 or an external storage apparatus 200, 201, 202. When data input/output is performed between a DKA 120 and a disk drive 161, the DKA 120 converts logical addresses to physical addresses.

When disk drives 161 are managed in accordance with RAID, the DKA 120 carry out data access according to the RAID configuration. For example, the DKA 120 either write the same data to different disk drive groups (RAID groups) (RAID 1), or execute a parity check, and write the data and the parity to a disk drive group (RAID 5).

Cache memory 130 stores data received from either a host 10 or an external storage apparatus 200, 201, 202. Cache memory 130 also stores data read out from a disk drive 161. As will be explained below, a virtual intermediate storage device can be constructed using the storage space of cache memory 130.

Shared memory (There are also times when this is called control memory.) 140 stores various control information for use in the operation of the main storage apparatus 100. A work area is also established in shared memory 140, and various types of tables, which will be described below, are stored in shared memory 140.

Furthermore, any one or a plurality of disk drives 161 can be used as a disk for cache. Cache memory 130 and shared memory 140 can be configured as separate memories, and it is also possible to use a part of the storage area of the same memory as a cache area, and to use the other part of the storage area of this same memory as a control area.

The connection controller 150 mutually connects the CHA 110, DKA 120, cache memory 130, and shared memory 140. The connection controller 150, for example, can be constituted as a crossbar switch or the like.

Storage 160 comprises a plurality of disk drives 161. As a disk drive 161, a variety of storage devices and their equivalents can be utilized, such as, for example, a hard disk drive, flexible disk drive, magnetic tape drive, semiconductor memory drive, optical disk drive, and the like. For example, different types of disks can also be intermixed inside storage 160, like a FC (Fibre Channel) disk, or SATA (Serial AT Attachment) disk.

A service processor (SVP) 170 is connected to the respective CHA 110 via a LAN or some other such internal network CN5. The SVP 170 can transfer data back and forth to shared memory 140 or DKA 120 by way of the CHA 110. The SVP 170 collects various information from inside the main storage apparatus 100, and provides it to the management terminal 20.

The constitution of an external storage apparatus will be explained using external storage apparatus 200 as an example. External storage apparatus 200, for example, can be constituted comprising a controller 210, and a plurality of disk drives 220. External storage apparatus 200 is connected to the main storage apparatus 100 via a communications network CN4 from a communication port 211. The communications network CN4, for example, can be configured from a SAN or LAN.

External storage apparatus 200 can also either comprise practically the same constitution as the main storage apparatus 100, or can adopt a simpler constitution than the main storage apparatus 100. There are cases wherein all or part of the disk drives 220 of the external storage drive 200 are treated as internal storage devices of the main storage apparatus 100. Since the other external storage apparatus 201, 202 can also be constituted the same as external storage apparatus 200, an explanation of these will be omitted.

The network configuration of the storage system needs to be taken into consideration here. As shown in FIG. 2 and FIG. 3, the communications network CN1 connecting the host 10 and the main storage apparatus 100, and the communications networks CN3, CN4, by which the respective storage apparatus 100, 200, 201, 202 are connected, are configured as separate communications networks. The internetworking networks (CN3 and so forth) interconnecting the respective sub-networks 400, 401, 402 are also configured as mutually independent communications networks.

Figure 4:
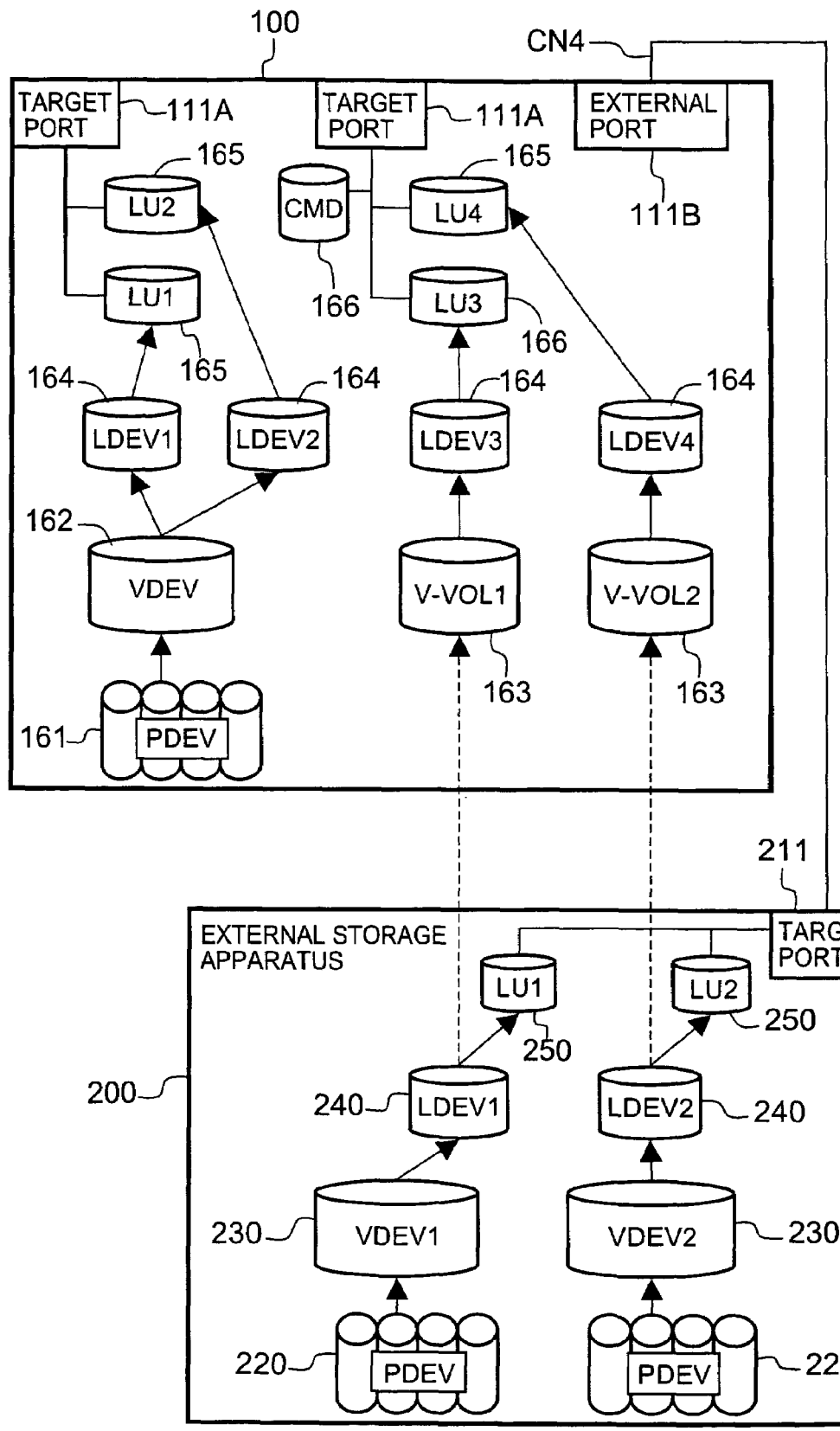
FIG. 4 is a block diagram showing a schematic view of a storage structure.

Refer to FIG. 4. FIG. 4 is a schematic diagram showing a storage structure of the storage system. In FIG. 4, external storage apparatus 200 is given as an example of the plurality of external storage apparatus distributed on the network. First of all, the constitution of the main storage apparatus 100 will be explained.

The storage structure of the main storage apparatus 100, for example, can be broadly divided into a physical storage hierarchy and a logical storage hierarchy. The physical storage hierarchy is constituted from PDEV (Physical Devices) 161, which are physical disks. A PDEV corresponds to a disk drive 161.

The logical storage hierarchy can be constituted from a plurality (for example, two types) of hierarchies. One logical hierarchy can be constituted from a VDEV (Virtual Device) 162, and virtual VDEV (hereinafter also referred to as "V-VOL") 163, which are treated like the VDEV 162. Another logical hierarchy can be constituted from LDEV (Logical Devices) 164.

The VDEV 162, for example, is constituted by grouping together a prescribed number of PDEV 161 having four units per group (3D+1P), eight units per group (7D+1P), and so forth. A single RAID storage area is constituted by clustering the storage areas provided by the respective groups of PDEV 161. This RAID storage area becomes the VDEV 162.

In contrast to the VDEV 162, which is constructed on top of a physical storage area, the V-VOL 163 is a virtual intermediate storage device, which does not require a physical storage area. V-VOL 163 are used for mapping the LU (Logical Unit) of external storage apparatus 200, and as such, are not directly related to physical storage areas.

At least one LDEV 164 can be disposed on top of either a VDEV 162 or a V-VOL 163. An LDEV 164 can be constituted, for example, by partitioning a VDEV 162 into fixed lengths. When the host 10 is an open system host, the host 10 recognizes an LDEV 164 as one physical disk in accordance with the LDEV 164 being mapped to an LU 165. An open system host accesses a desired LDEV 164 by specifying a LUN (Logical Unit Number) or logical block address. Furthermore, in the case of a mainframe system host, the host 10 directly recognizes an LDEV 164.

An LU 165 is a device that is recognizable as a SCSI logical unit. The LU 165 are connected to the host 10 via target ports 111A. At least one LDEV 164 can be associated to each LU 165. Furthermore, associating a plurality of LDEV 164 to a single LU 165 also makes it possible to virtually expand the size of an LU.

A CMD (Command Device) 166 is a dedicated LU used to transfer commands and states between an I/O control program running on the host 10 and the storage apparatus 100.

A command from the host 10 is written to the CMD 166. The storage apparatus 100 executes processing in accordance with the command written to the CMD 166, and writes the results of this execution to the CMD 166 as the status. The host 10 reads and confirms the status written to the CMD 166, and writes the contents of processing to be executed subsequently to the CMD 166. By so doing, the host 10 is able to issue various instructions to the storage apparatus 100 via the CMD 166.

Further, the storage apparatus 100 can also directly process a command received from the host 10 without storing it in the CMD 166. The constitution can be such that a CMD is generated as a virtual device without defining a real device (LU), and the storage apparatus 100 receives and processes commands from the host 10. In other words, for example, a CHA 110 writes a command received from the host 10 to shared memory 140, and either a CHA 110 or a DKA 120 processes the command stored in this shared memory 140. The results of this processing are written to shared memory 140, and sent to the host 10 from a CHA 110.

The external storage apparatus 200 is connected by way of a communications network CN3 to a main storage apparatus 100 initiator port (External Port) 111B for external connections.

The external storage apparatus 200 comprises a plurality of PDEV 220; VDEV 230, which are established on PDEV 220-provided storage areas; and at least one LDEV 240 capable of being established on top of the VDEV 230. The respective LDEV 240 are associated with LU 250, respectively. The PDEV 220 correspond to the disk drives 220 in FIG. 3.

The LU 250 of the external storage apparatus 200 (that is, the LDEV 240) are mapped to V-VOL 163. For example, "LDEV 1" and "LDEV 2" of the external storage apparatus 200 are associated to "V-VOL 1" and "V-VOL 2", respectively, of the main storage apparatus 100 via "LU 1" and "LU 2" of the external storage apparatus 200. "V-VOL 1" and "V-VOL 2" are associated to "LDEV 3" and "LDEV 4", respectively, and the host 10 can utilize these volumes via "LU 3" and "LU 4".

Furthermore, a RAID configuration can be applied to VDEV 162 and V-VOL 163. That is, a single disk drive 161 can also be allocated to a plurality of VDEV 162, V-VOL 163 (slicing), and a single VDEV 162, V-VOL 163 can also be formed from a plurality of disk drives 161 (striping).

FIG. 5 is a schematic diagram showing an example of an extraction condition specification screen G1 for specifying conditions for extracting a desired external volume. This screen G1, for example, is provided by the SVP (Service Processor) 170.

The extraction condition specification screen G1, for example, is constituted such that various desired conditions can be selected for each item, like the sub-system class, device type, vendor name, storage capacity and number of LUN.

"Sub-system class" signifies the type of class to which the respective external storage apparatus 200, 201, 202 belong. For example, enterprise class, mid-range class, and entry class can be cited as sub-system classes. Further, when any sub-system class will do, a user can select "Disregard".

"Device Type" signifies the type of storage device comprising external storage apparatus 200, 201, 202. For example, magnetic disk, magnetic tape, optical disk and the like can be cited as types of devices. Further, when any device type will do, a user can select "Disregard".

"Vendor Name" means the name of the vendor, who provided the respective external storage apparatus 200, 201, 202. When any vendor will do, a user can select "Disregard".

"Storage Capacity" signifies the free space that a user desires. A user can directly input the value of the required storage capacity. "Number of LUN" signifies the number of LUN a user desires. A user can directly input the required number of LUN. Instead of this, for example, the screen G1 can also be constituted such that a user selects a value for the required free space and number of LUN from among a plurality of options prepared in advance, like "100 GB", "300 GB", "500 GB". Further, when the storage capacity and number of LUN do not matter, a user need not input values for the storage capacity or the number of LUN.

Thus, the extraction condition specification screen G1 is constituted to enable the selection of external storage apparatus comprising desired attributes in accordance with the specification of one or a plurality of user-desired attributes. Ordinarily, a user will specify at least one or more attributes (conditions). When a user fails to specify even one condition, error processing can be performed. Or, when a user fails to specify even one condition, it is also possible to detect all the external storage apparatus 200, 201, 202 distributed on the network.

The point to be noted here is that a user specifies desired conditions rather than directly specifying specific external storage apparatus. For example, if the only sub-network in FIG. 2 was sub-network 400, the storage network was not all that large, and the user was familiar with the constitution of the storage network, then it would be possible to specify desired external storage apparatus directly.

By contrast, when numerous sub-networks 400, 401, 402 are linked to configure a large-scale storage network as shown in FIG. 2, a user must expend considerable effort to become familiar with the constitution of the storage network. Therefore, it becomes difficult for a user to find the desired external storage apparatus on his own. Furthermore, it becomes even more difficult for a user single-handedly to find the desired external storage apparatus under a heterogeneous environment in which a wide variety of external storage apparatuses are intermixed on a large-scale storage network.

Accordingly, in this embodiment, an extraction condition specification screen G1 like that shown in FIG. 5 is provided. This makes it possible to search for external storage apparatus comprising conditions that a user wants even when the user is not able to directly specify a desired external storage apparatus. Therefore, even a user, who is not familiar with the constitution of a storage network, can detect and utilize desired external storage apparatus.

FIG. 6 is a schematic diagram showing an example of a constitution of a table for managing external resource search conditions T1. This management table T1 is configured in accordance with the extraction condition specification screen G1. The management table T1, for example, is stored in shared memory 140. The management table T1, for example, is constituted comprising extraction condition items ("Item 1" in the figure); options for these respective items ("Item 2" in the figure); option codes; and flags showing whether or not an option has been specified.

In the extraction condition specification screen G1, "1" is set in this flag for conditions, which have been selected by a user. Also, when the user specifies "Storage Capacity" and "Number of LUN" by inputting numbers, these numbers are stored in the "Code" column.

FIG. 7 is a schematic diagram showing an example of a constitution of a sub-system class determination table T2. This determination table T2, for example, is stored in shared memory 140. The determination table T2 is used to determine which sub-system classes of the respective external storage apparatus distributed and deployed on the network. The names of various vendor apparatus on the market are pre-registered in the determination table T2.

The contents of this determination table T2, for example, can be updated by inputting the latest data from the management terminal 20. The names of the various apparatus provided by respective vendors are registered in the determination table T2 by class. The names of the various apparatus, for example, can be expressed using ASCII codes.

FIG. 8 is a schematic diagram showing an example of a constitution of an external resource management database T3. The external resource management database T3 is for managing information related to the respective external storage apparatus distributed and deployed on the network (storage information). The external resource management database T3, for example, is stored in shared memory 140.

The external resource management database T3, for example, can be constituted by corresponding apparatus number, apparatus name, vendor ID (identification information), product number (model number), number of LUN, LUN number, WWN, device type, and storage capacity (size).

The apparatus number is a number that makes it possible to uniquely specify a storage apparatus inside a storage system. The apparatus name is the name given to this storage apparatus by the vendor. For example, when a nickname has been given to a storage apparatus by a systems administrator or other user, it is possible to use this nickname instead. The vendor ID is information that makes it possible to uniquely specify a vendor at least inside the storage system. The product number is vendor-provided information about this storage apparatus.

The number of LUN indicates the total number of LUN that this storage apparatus possesses. The LUN number is information for identifying the respective LUN that this storage apparatus possesses. WWN is information for identifying this storage apparatus' respective ports. Device type is information indicating the types of storage devices constituting this storage apparatus' logical volumes. Size is information indicating the free space of this storage apparatus' logical volumes. Furthermore, instead of WWN, for example, there are also cases in which the ports are identified with IP addresses.

FIG. 9 is a schematic diagram showing an example of a constitution of a connection management table (mapping table) T4 for an external volume. This management table T4 is used for capturing a logical volume belonging to the external storage apparatus 200, 201, 202 by connecting it to a virtual intermediate volume (V-VOL) 163 of the main storage apparatus 100.

The connection management table T4, for example, is constituted by corresponding the VDEV number, disk type, size, WWN, LUN number, apparatus number and vendor ID. The VDEV number is information for identifying a V-VOL 163 inside the main storage apparatus 100. Device type is information indicating the type of external storage device associated to a V-VOL 163. Size is information indicating the capacity of V-VOL 163. WWN is information for specifying the port to which this external volume is connected. The LUN number is information for specifying this external volume. The apparatus number is information for specifying the storage apparatus in which this external volume exists. The vendor ID is information that specifies the vendor of this storage apparatus.

In this way, it is possible to connect the volume of an external storage apparatus to a V-VOL 163 by associating an external volume port number, WWN and LUN number to a VDEV number, which specifies the V-VOL 163. Referencing this management table T4 makes it possible to process access requests associated to the V-VOL 163. One example of access processing will be explained below.

Next, FIG. 10 is a schematic diagram showing an example of a constitution of an external volume response performance management table T5. This management table T5 manages the response performance of a volume of an external storage apparatus. Details will be explained further hereinbelow, but in this embodiment, when various storage information is collected from external storage apparatus, this management table T5 ascertains the response performance of the external storage apparatus, and stores the results of this check.

The response performance management table T5, for example, can be constituted by corresponding the apparatus number, vendor ID, number of LUN, the response time integrated value, the number of commands issued, and the response time threshold value.

The main storage apparatus 100 issues either one or a plurality of commands to the respective external storage apparatus as needed. The commands issued here are query commands for acquiring the configurations of the external storage apparatus.

"Apparatus Number", "Vendor ID", and "Number of LUN" have already been explained. "Number of Commands Issued" is the total number of commands issued to this external storage apparatus. "Response Time Integrated Value" is the integrated value of the response times to commands issued to this external storage apparatus. The sum of the response times required for this external storage apparatus to process commands is stored. The "Response Time Threshold Value" is a standard value for comparing values arrived at by dividing the integrated value of response times by the number of commands issued (=average response time per command).

When a user specifies the extraction of an external storage apparatus to search for a desired external storage apparatus, the main storage apparatus 100 issues a query command to the external storage apparatus. The external storage apparatus respond to this query command, respectively sending replies concerning the contents of the query to the main storage apparatus 100.

The response times of the external storage apparatus at this time will differ according to the state of each external storage apparatus. For example, when the distance between the main storage apparatus 100 and an external storage apparatus is great, the response time of this external storage apparatus will be long due to the delays that occur during data transmission. Also, when the CPU performance of the external storage apparatus is low, or there is a dearth of cache memory, or the I/O load of the external storage apparatus is great, there are times when the response from this external storage apparatus will be late.

Thus, the response performance of the external storage apparatus will differ in accordance with the distance between the main storage apparatus 100 and an external storage apparatus, and the performance of the external storage apparatus. When a late-responding external storage apparatus is connected to the main storage apparatus 100, it is necessary to take this response delay into consideration. Accordingly, when the main storage apparatus 100 collects storage information from the respective external storage apparatus, it monitors the response performance of each external storage apparatus, and stores this performance in the response performance management table T5.

Further, the response performance of an external storage apparatus can be continuously monitored even after this external storage apparatus is connected to the main storage apparatus 100.

Figure 11:
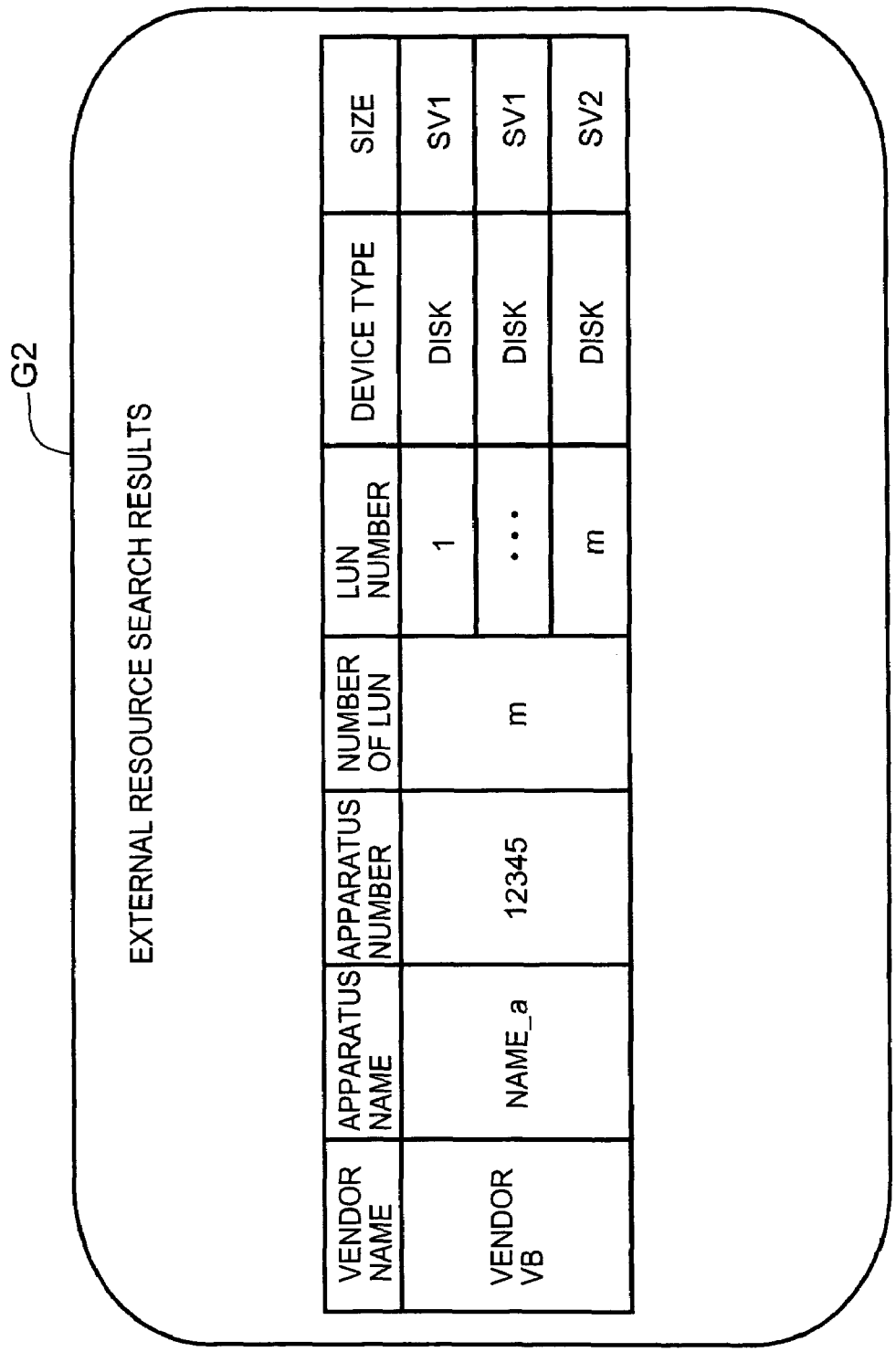
FIG. 11 is a schematic diagram showing a screen for displaying external resource search results.

FIG. 11 is a schematic diagram showing a search results screen G2 for displaying the results of an external resource search to a user. External volume (external resource) information that satisfies the conditions specified by a user in screen G1 are displayed in this search results screen G2. The user confirms the contents displayed on the search results screen G2, and selects one or a plurality of external volumes for use.

Figure 12:
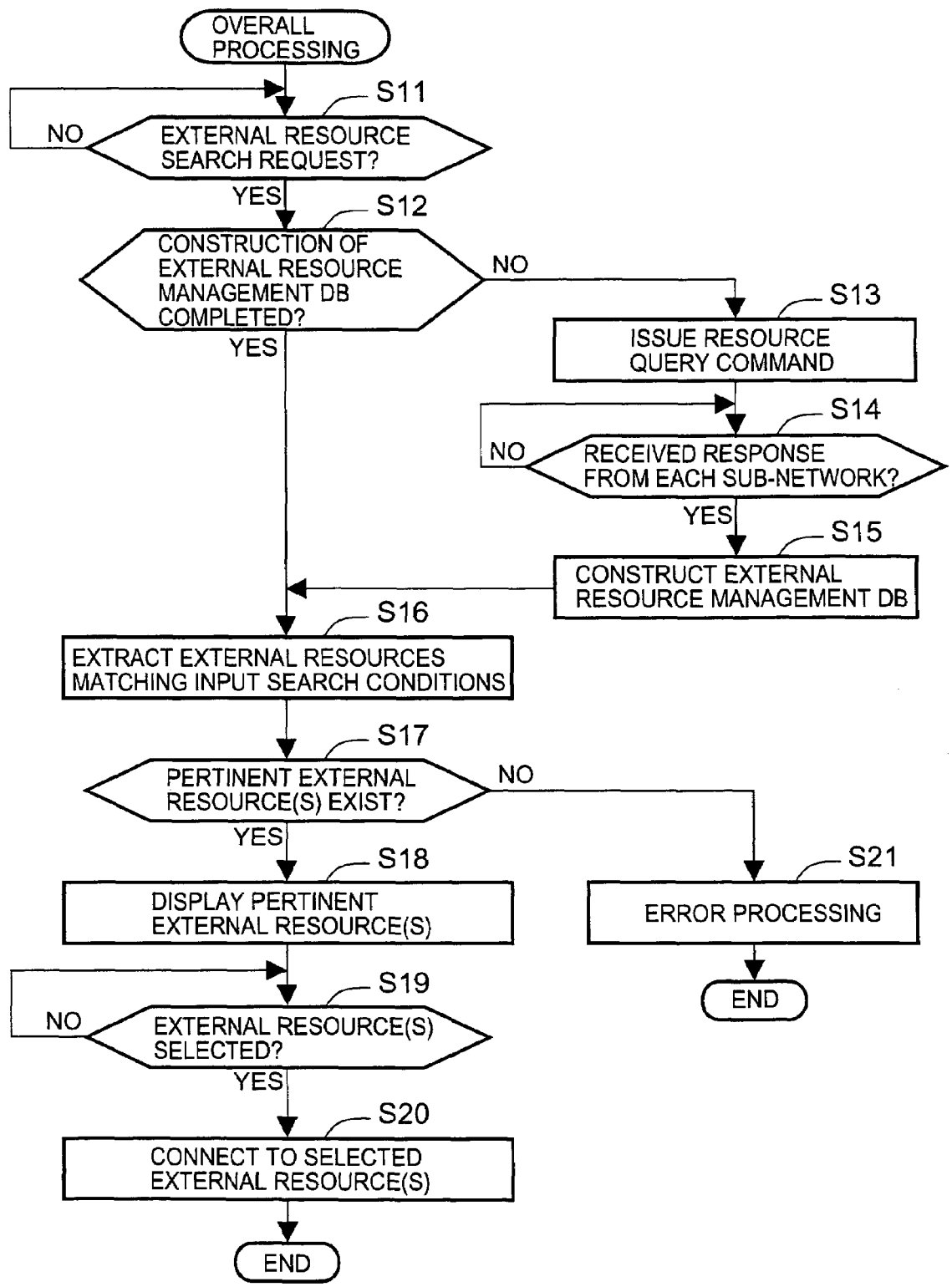
FIG. 12 is a flowchart showing an overview of storage system processing.

Next, FIG. 12 is a flowchart showing the entire process from the search for external volumes up until they are put to use. The main storage apparatus 100 determines whether or not an external resource search request (extraction request) has been input from the management terminal 20 (S11).

When an external resource search has been requested from the management terminal 20 (S11: YES), the main storage apparatus 100 determines whether or not an external resource management database T3 has been constructed (S12).

When an external resource management database T3 has not been generated yet (S12: NO), the main storage apparatus 100 issues a resource query command (S13). Then, the main storage apparatus 100 receives responses from the respective external storage apparatus (S14: YES), and registers the received contents in the external resource management database T3 (S15).

An external resource management database T3 is either entirely or partially constructed by executing steps S13 through S15. It is sufficient if only information that corresponds at least to the conditions specified by the user can be acquired from the respective external storage apparatus at this time; the entire external resource management database T3 need not be completed. A more detailed example of steps S13 through S15 will be explained further hereinbelow.

When the external resource management database T3 has been generated to the extent that it is possible to extract user-desired resources, or when an external resource management database T3 comprising the required contents has already been generated (S12: YES), the main storage apparatus 100 carries out a search based on the conditions specified by the user (S16). This search will be explained below.

The main storage apparatus 100 determines whether or not external resources (external volumes) matching the desired conditions of the user exist on the storage network (S17). When external resources matching the user's desires exist (S17: YES), the main storage apparatus 100 displays the search results screen G2 on the screen of the management terminal 20, showing the user all the external resources that were found (S18).

Next, the main storage apparatus 100 determines whether or not the user selected an external resource (S19). The user views the management terminal 20 screen, selects one or a plurality of external resources, which he wants to use, and inputs the results of this selection to the main storage apparatus 100 from the management terminal 20.

The main storage apparatus 100 associates the external storage apparatus selected by the user to a V-VOL 163, and connects the external volume to a LU 165 of the main storage apparatus 100 via the V-VOL 163 (S20).

Furthermore, when there is no external resource matching the desired conditions of the user (S17: NO), the main storage apparatus 100 can carry out error processing (S21). In this error processing, for example, a predetermined error message, such as "The desired external resource could not be found. Please change your extraction conditions and try again." can be displayed on the screen of the management terminal 20.

Figure 13:
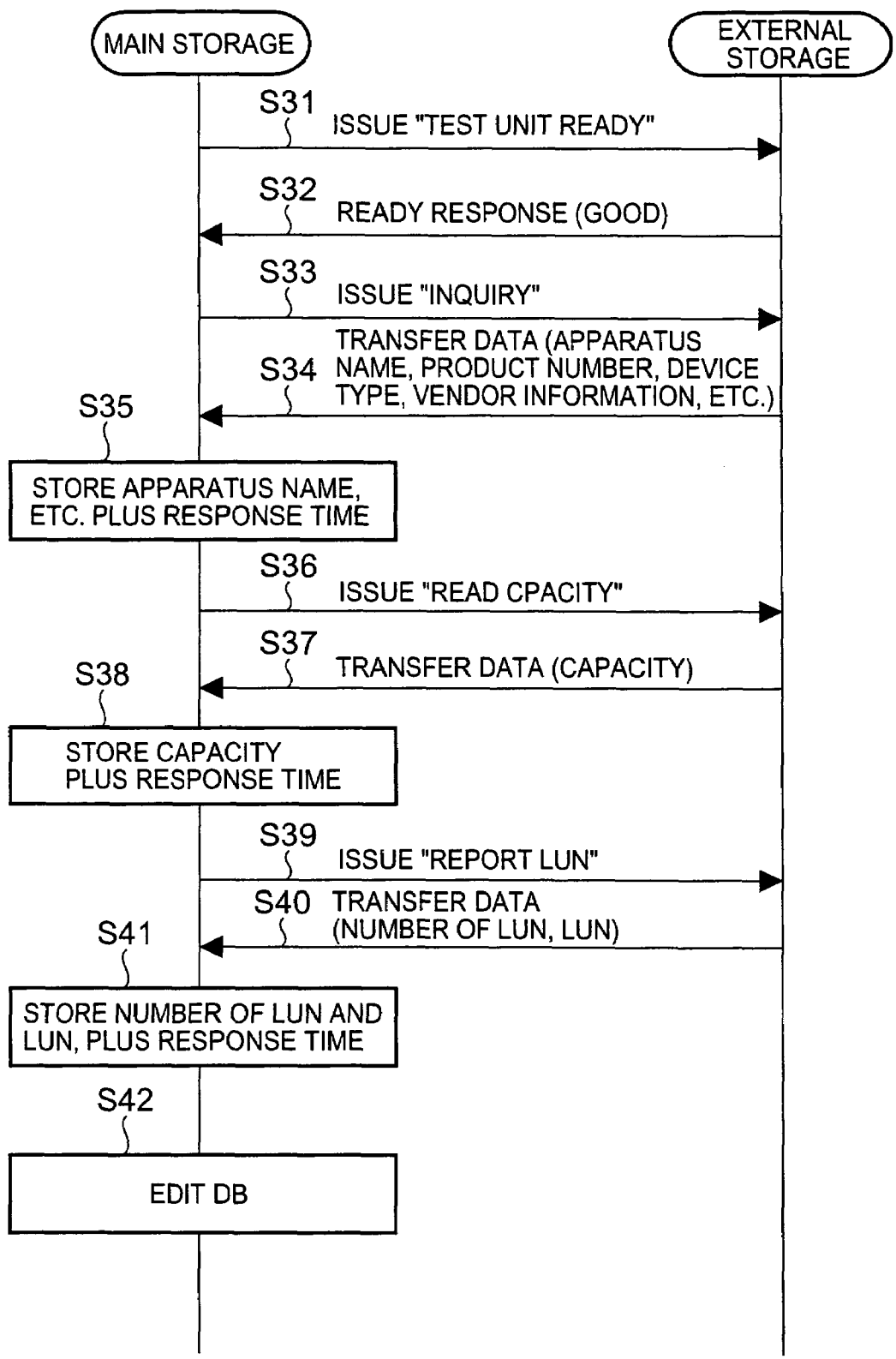
FIG. 13 is a flowchart showing processing when collecting storage information from external storage apparatus and generating an external resource management database.

FIG. 13 is a flowchart showing steps S13 through S15 in FIG. 12 in detail. Firstly, the main storage apparatus 100 issues a command ("Test Unit Ready") to external storage apparatus in order to confirm their existence (S31). This existence confirmation command can be called the first query command. External storage apparatus, which are operating normally, will return a Ready response indicating Good status as a reply to this command (S32).

Next, the main storage apparatus 100 issues a second query command ("Inquiry") to the respective external storage apparatus whose existence has been confirmed (S33). The external storage apparatus that receive this query command, for example, send storage information, such as apparatus name, product number, device type, and vendor information to the main storage apparatus 100 (S34).

The main storage apparatus 100 registers the apparatus names, device types and other such information acquired from the respective external storage apparatus in the external resource management database T3 (S35). The main storage apparatus 100 also registers the number of commands issued to an external storage apparatus, and the response times per command in the response performance management table T5 (S35).

Next, the main storage apparatus 100 issues a third query command ("Read Capacity") to the respective external storage apparatus (S36). The external storage apparatus send information related to storage capacity to the main storage apparatus 100 (S37). The main storage apparatus 100 registers the storage capacity-related information acquired from the respective external storage apparatus in the external resource management database T3 (S38). Further, in addition to registering the response times of the respective external storage apparatus 100 relative to the "Read Capacity" command in the response performance management table T5, it also increments the number of commands issued by one inside the table T5 (S38).

Furthermore, if "Storage Capacity" is not included in the user-specified conditions, the issuing of the "Read Capacity" command can be called off. However, when an external volume is connected to a V-VOL 163, the value of that external volume's storage capacity has to be acquired.

When necessary, the main storage apparatus 100 sends a fourth query command ("Report LUN") to the respective external storage apparatus (S39). The external storage apparatus send their number of LUN and LUN numbers to the main storage apparatus 100 (S40). The main storage apparatus 100 registers the number of LUN and so forth acquired from the external storage apparatus in the external resource management database T3 (S41). Further, in addition to registering the response times of the respective external storage apparatus 100 relative to the "Report LUN" command in the response performance management table T5, it also increments by one inside the table T5 the number of commands issued (S41). When "Number of LUN" is not included in the user-specified conditions, there is no need to issue a "Report LUN" command, at least not at this time.

The constitution is such that, by so doing, the main storage apparatus 100 is able to acquire only required information from the external storage apparatus by successively issuing a plurality of query commands to the external storage apparatus. Then, the main storage apparatus 100 edits the external resource management table T3, and terminates this processing (S42).

Figure 14:
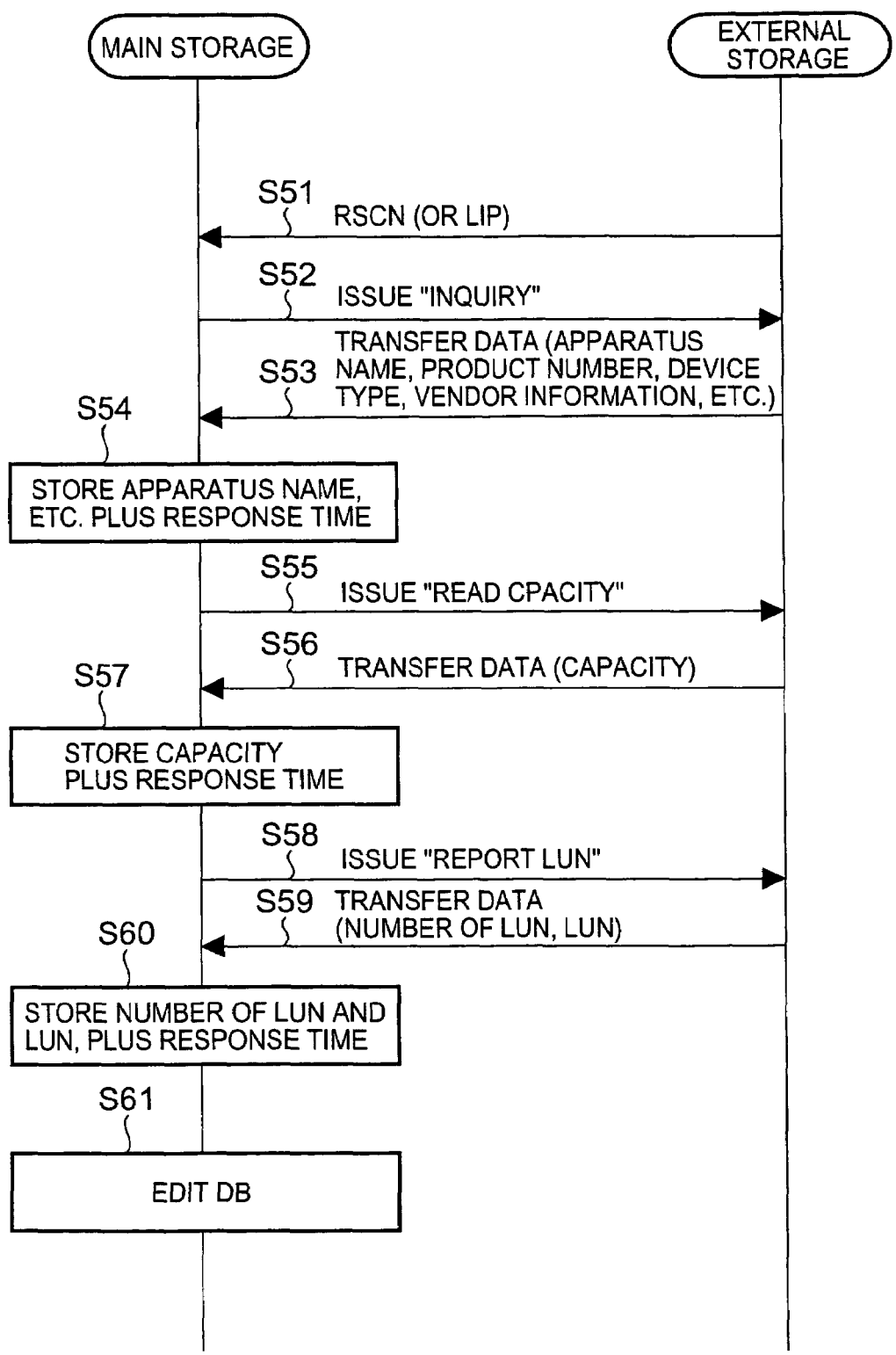
FIG. 14 is a flowchart showing processing for updating an external resource management database based on storage node changes.

FIG. 14 is a flowchart showing processing for automatically updating an external resource management database T3.

When the storage configuration on a network changes after the external resources management database T3 is complete, the management table T3 must be updated to meet the current situation. In particular, in the case of a storage system, which comprises a plurality of sub-networks 400, 401, 402, and in which a variety of storage apparatus 100, 200, 201, 202 are intermixed, fluctuations in the system's environment are relatively numerous. Accordingly, as will be described hereinbelow, this embodiment detects changes in the nodes (storage apparatus) on the network, and uses this detection as a trigger to update the external resources management database T3 with the latest contents.

When a change occurs in the external storage apparatus on the network, for example, a state change notification, such as RSCN (Registered State Change Notification) or LIP (Loop Initialization Primitive), is issued from the source of the change. State change occurrences inside the same sub-network are notified to other nodes in this sub-network in accordance with LIP. A state change that occurs in another sub-network is notified via RSCN. Besides these notifications, for example, SCR (State Change Registration) and SCN (State Change Notification) are also known. Furthermore, there are cases when a state change notification is output from the storage apparatus involved in the change, and there are also case when a state change notification is output from the management apparatus (for example, switches 300, 301, 302) of the sub-network to which the storage apparatus involved in the change belongs.

A state change notification like this, for example, is output when the connection state to a fabric (sub-network) has been changed, such as when an external storage apparatus has been disconnected from a sub-network, or when an external storage apparatus has been connected to a sub-network.

The main storage apparatus 100 receives a RSCN or other such state change notification (S51), and spontaneously sends an "Inquiry" command to the sub-network on which this state change occurred (S52). In FIG. 14, it looks as if an "Inquiry" command is sent directly to the external storage apparatus, which generated the state change, but in reality, the "Inquiry" command is sent to the sub-network on which this external storage apparatus is disposed.

The respective external storage apparatus disposed on this sub-network send apparatus names, product numbers, device types and other such information to the main storage apparatus 100 (S53). Thereafter, the same as described in FIG. 13, the main storage apparatus 100 updates the storage contents of the external resource management database T3 in accordance with the information acquired from the respective external storage apparatus (S54), and also updates the response performance management table T5 (S54). That is, when the external resource management database T3 is updated, the response performance management table T5 is also updated.

Next, the main storage apparatus 100 issues a "Read Capacity" command (S55), and queries the respective external storage apparatus on this sub-network as to their storage capacities. The external storage apparatus send the values of their respective storage capacities to the main storage apparatus 100 (S56). The main storage apparatus 100 updates the external resource management database T3 on the basis of the storage capacities acquired from the external storage apparatus (S57). The main storage apparatus 100 also updates the response performance management table T5 (S57).

Next, the main storage apparatus 100 sends a "Report LUN" command to the external storage apparatus (S58). The external storage apparatus send numbers of LUN and LUN numbers to the main storage apparatus 100 (S59). In addition to the main storage apparatus 100 updating the storage contents of the external resources management database T3 based on the numbers of LUN and other information acquired from the external storage apparatus, it also updates the contents of the response performance management table T5 (S60). Then, finally the main storage apparatus 100 edits the external resources management database T3 and terminates this update processing (S61).

Thus, update processing is not executed on the basis of conditions specified by a user, but rather, is executed when triggered by node changes on a network. Therefore, unlike when the external resources management database T3 is constructed, each of the respective query commands (Inquiry, Read Capacity, Report LUN) is issued.

Figure 15:
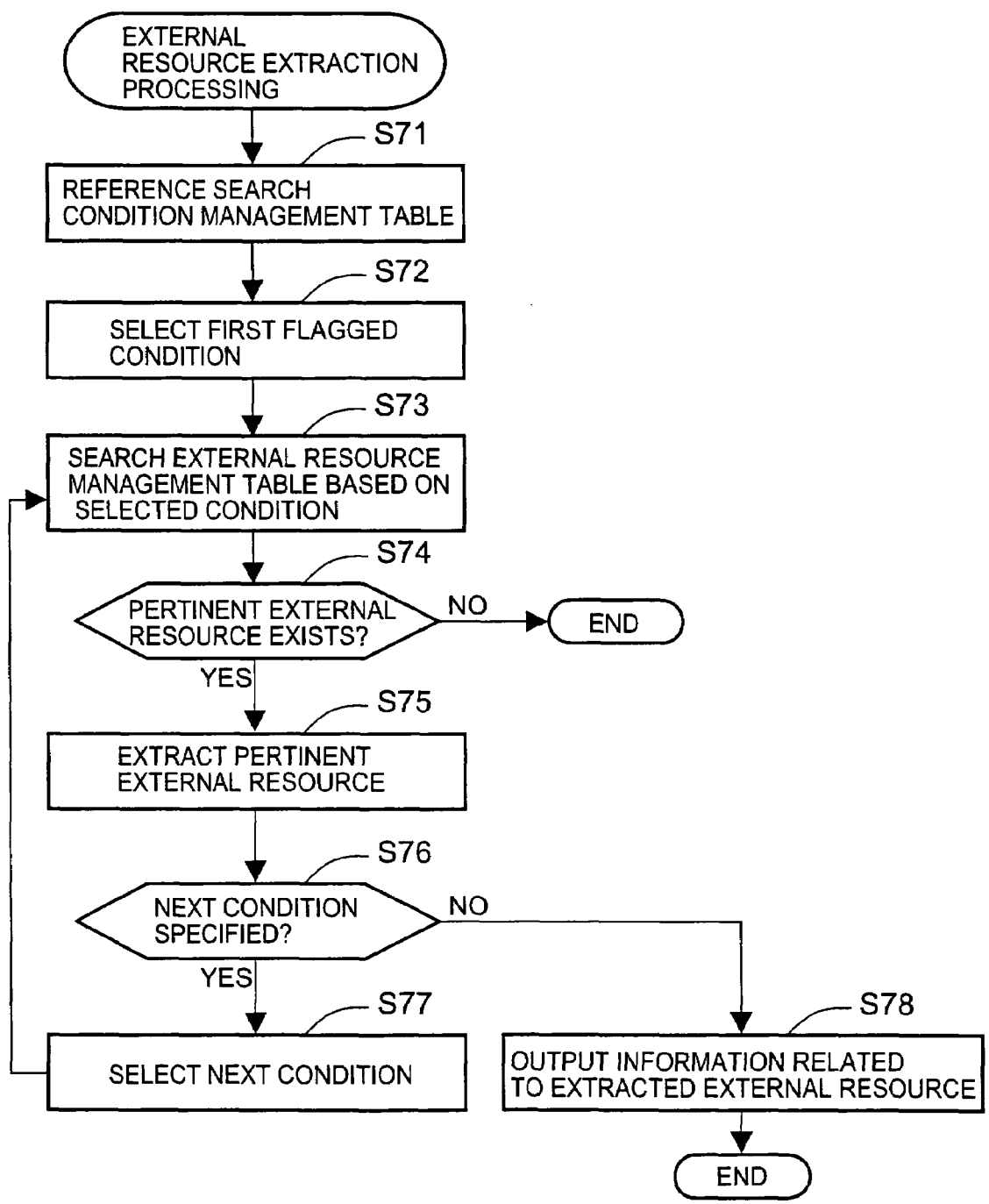
FIG. 15 is a flowchart showing external resource extraction processing.

FIG. 15 is a flowchart showing an example of external resource extraction processing. This flowchart corresponds to S16 in FIG. 12.

The main storage apparatus 100 references the external resources search condition management table T1 (S71), and selects the first flagged condition (S72). The main storage apparatus 100 searches the external resources management database T3 on the basis of the selected condition (S73), and determines whether or not an external resource, which satisfies this condition, exists (S74).

When there is no external resource satisfying this condition (S74: NO), the main storage apparatus 100 terminates extraction processing. By contrast, when there is an external resource that satisfies this condition (S74: YES), the main storage apparatus 100 extracts and temporarily stores this external resource (S75).

Then, the main storage apparatus 100 references the search condition management table T1, and determines whether or not the next condition has been specified (S76). When the next condition has been specified (S76: YES), the main storage apparatus 100 selects this condition (S77), and searches the external resources management database T3 on the basis of this condition (S73). Similarly thereafter the main storage apparatus 100 filters external resources that satisfy the respective conditions specified by a user (S74, S75). When the search for all the conditions specified by a user is over (S76: NO), the main storage apparatus 100 outputs information related to the external resources that correspond to all the conditions (S78).

Figure 16:
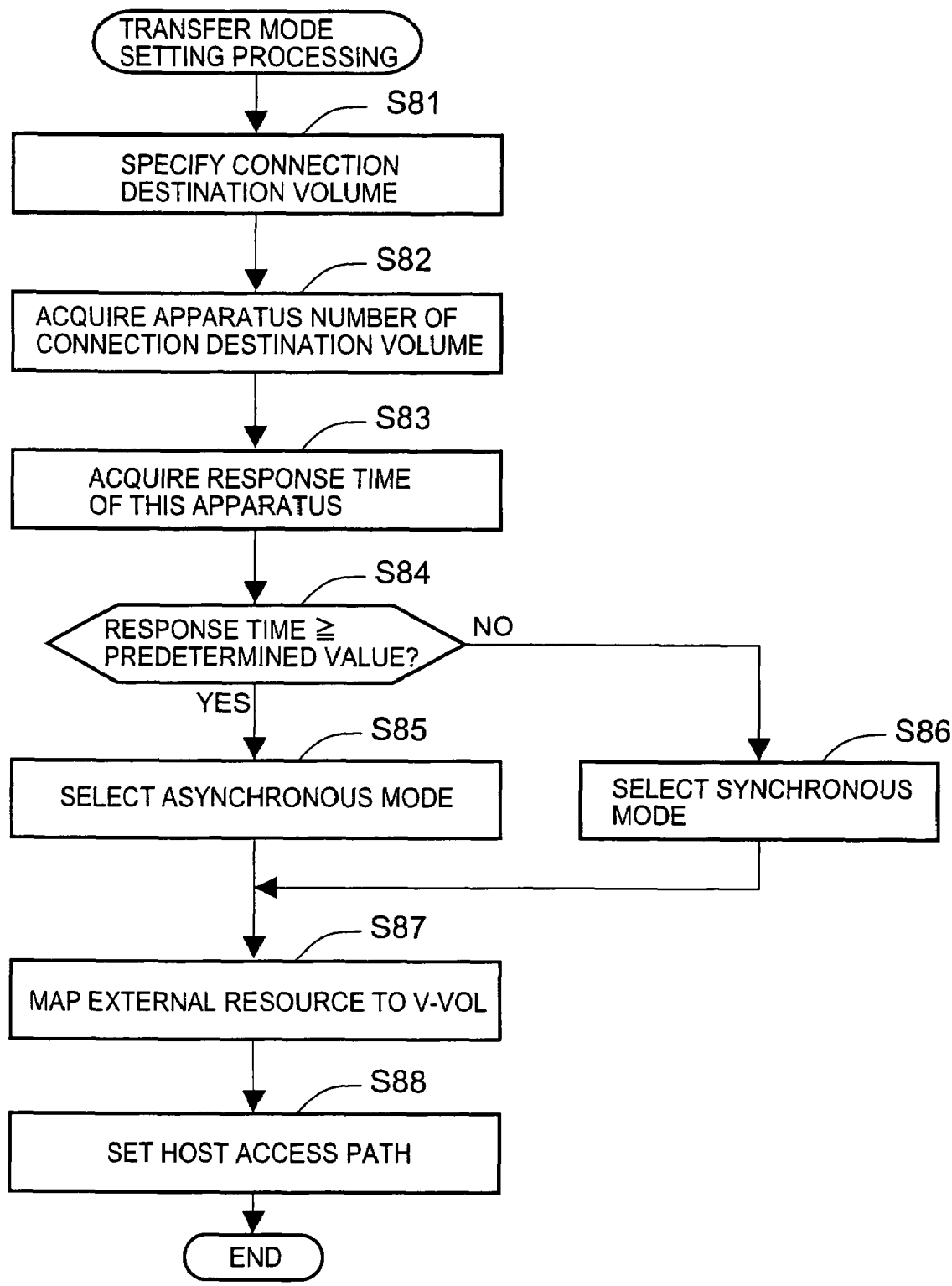
FIG. 16 is a flowchart showing processing for setting a transfer mode based on the response performance of an external storage apparatus.

FIG. 16 is a flowchart showing processing for setting a transfer mode. In this embodiment, the main storage apparatus 100 monitors the response performance of external storage apparatus when searching for external volumes. Then, when an external volume is selected and actually utilized, the main storage apparatus 100 decides the transfer mode (remote copying mode) by taking into consideration the response performance of the external storage apparatus where this external volume exists. An asynchronous transfer mode and a synchronous transfer mode can be cited as transfer modes.

In the case of a synchronous transfer mode, when the main storage apparatus 100 receives a write request from a host 10, the main storage apparatus 100, after storing the write data received from the host 10 in cache memory 130, transfers this write data to an external storage apparatus via a communications network. When the external storage apparatus receives the write data and stores it in cache memory, it sends a response signal to the main storage apparatus 100. When the main storage apparatus 100 receives the response signal from the external storage apparatus, it sends a write-complete report to the host 10.

Thus, in the synchronous transfer mode, the main storage apparatus 100 notifies the host 10 that write command processing is complete subsequent to transferring the write data to the external storage apparatus. Therefore, in the synchronous transfer mode, the delay is only the time that the main storage apparatus 100 waits for the response from the external storage apparatus. For this reason, the synchronous transfer mode is best suited for cases where the distance between the main storage apparatus and the external storage apparatus is relatively short. Conversely, when the main storage apparatus 100 and the external storage apparatus are separated by a great distance, generally speaking, the synchronous transfer mode is not very suitable due to the problems of response delay and propagation delay.

By contrast, in the case of the asynchronous transfer mode, when the main storage apparatus 100 receives a write request from a host 10, after storing the write data in cache memory 130, it immediately sends a write-complete report to the host 10. The main storage apparatus 100 transfers the write data to an external storage apparatus after sending a write-complete report to the host 10. The write-complete report to the host 10 and the data transfer to the external storage apparatus are carried out asynchronously. Therefore, in the case of the asynchronous transfer mode, no matter what the distance between the main storage apparatus 100 and the external storage apparatus, a write-complete report can be quickly sent to the host 10. Thus, the asynchronous transfer mode is well suited to cases where the main storage apparatus 100 and external storage apparatus are relatively far apart.

Returning to FIG. 16, firstly, the main storage apparatus 100 specifies the connected volume (S81). Connected volume signifies an external volume associated to a V-VOL 163. The main storage apparatus 100 references the external resources management database T3, and acquires the connected volume's apparatus number (S82). Next, the main storage apparatus 100 references the response performance management table T5 on the basis of this apparatus number, and acquires the response time (average response time) of the external storage apparatus comprising this connected volume (S83). This average response time can be determined by dividing the response time integrated value inside the response performance management table T5 by the number of commands issued.

Then, the main storage apparatus 100 compares the response time of this external storage apparatus against a predetermined threshold value (S84). This predetermined threshold value is the response time threshold value in the response performance management table T5. A response time threshold value can be set separately for each external storage apparatus.

When the average response time of this external storage apparatus is greater than the predetermined response time threshold value (S84: YES), the main storage apparatus 100 selects the asynchronous transfer mode (S85). By contrast, when the average response time of this external storage apparatus is less than the predetermined response time threshold value (S84: NO), the main storage apparatus 100 selects the synchronous transfer mode (S86).

Then, the main storage apparatus 100 associates an external volume of this external storage apparatus to a V-VOL 163 (S87). The main storage apparatus 100 also establishes a path between the V-VOL 163 and the host 10 so that the host 10 is able to access a LU 165 associated to this V-VOL 163 (S88).

Figure 17:
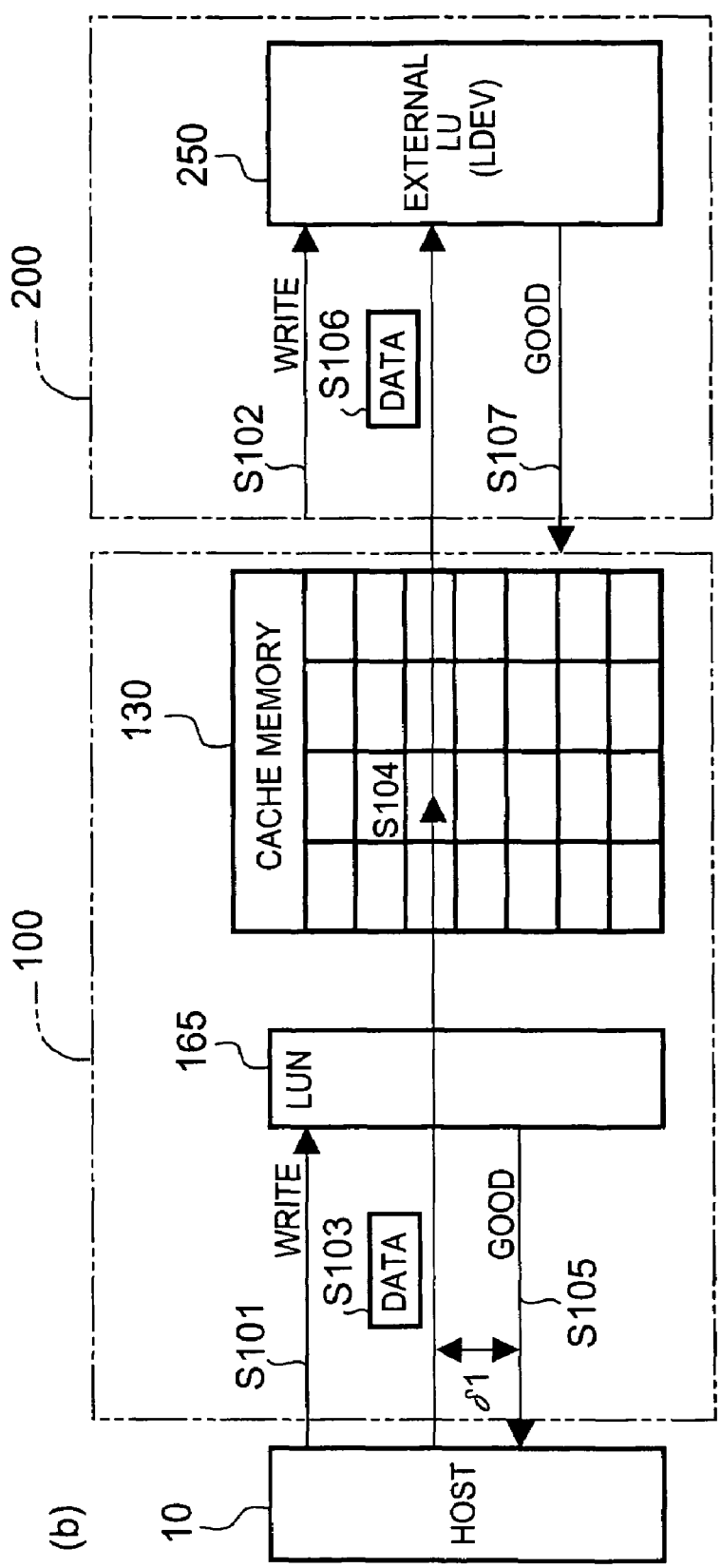
FIG. 17 is a schematic diagram showing a remote copying method in accordance with an asynchronous transfer mode.

FIG. 17 is a schematic diagram showing update processing when the asynchronous transfer mode has been set. The host 10 issues a write command to a prescribed LU 165 of the main storage apparatus 100 (S101). The LU 165 is associated to an LU 250 of an external storage apparatus 200 via a V-VOL 163. In other words, the LU 165 of the main storage apparatus 100 is the access target from the host 10, but the data is actually stored in the external LU 250. Therefore, for example, the LU 165 can also be called the "access destination logical storage device," and the LU 250 can also be called the "data storage destination logical storage device," respectively.

When the main storage apparatus 100 receives a write command from a host 10, it specifies the LU for which this write command is intended, references the connection management table T4, and determines whether or not this LU is associated to an external volume. When a write command is to a LU, which is associated to an external volume, the main storage apparatus 100 sends the write command to the external storage apparatus 200 that possesses this external volume (S102). Of the external storage apparatus 200, 201, 202, an explanation will be given here using external storage apparatus 200 as an example.

After issuing a write command, the host 10 sends to the main storage apparatus 100 the write data to be written to the LU 165 (S103). The main storage apparatus 100 temporarily stores the write data received from the host 10 in cache memory 130 (S104). When the main storage apparatus 100 stores the write data in cache memory 130, it reports write-complete to the host 10 (S105).

The main storage apparatus 100, after carrying out address conversion and so forth, sends the write data stored in cache memory 130 to the external storage apparatus 200 (S106). The external storage apparatus 200 stores the write data received from the main storage apparatus 100 in cache memory. Then, the external storage apparatus 200 reports write-complete to the main storage apparatus 100 (S107). The external storage apparatus 200, for example, waits until there is not much I/O, and writes the write data stored in cache memory to a storage device 220 (destage processing).

Thus, in the asynchronous transfer mode, the main storage apparatus 100 can send a write-complete response to the host 10 within a short response time δ1 after receiving write data from the host 10.

Figure 18:
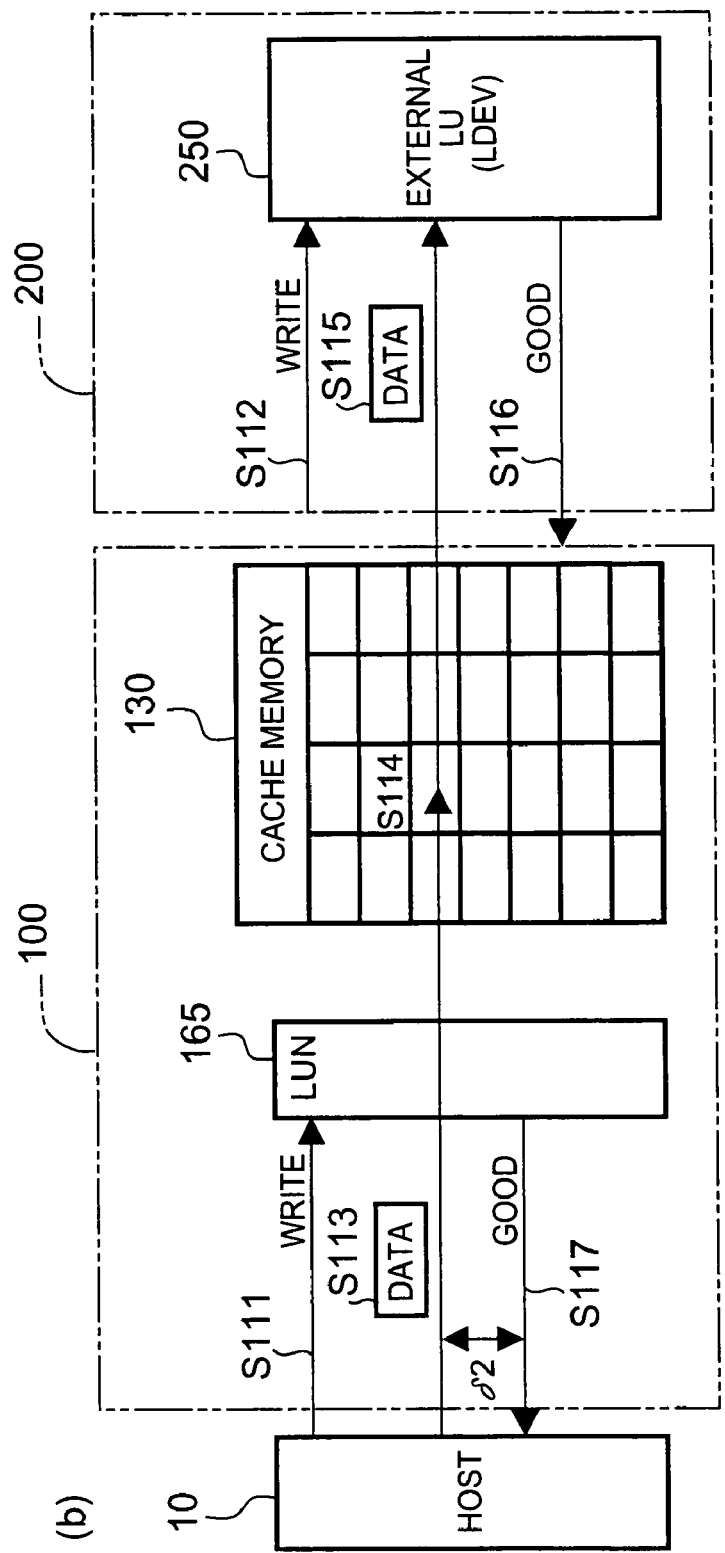
FIG. 18 is a schematic diagram showing a remote copying mode in accordance with a synchronous transfer mode.

FIG. 18 is a schematic diagram showing update processing when the synchronous transfer mode has been selected. When it receives a write command issued from a host 10 (S111), the main storage apparatus 100 specifies an external volume (LU 250), which is associated to this write command's access destination volume (LU 165), and issues a write command to this external volume (S112).

When the main storage apparatus 100 receives the write data from the host 10 (S113), it stores this write data in cache memory 130 (S114). The main storage apparatus 100 transfers the write data stored in cache memory 130 to the external storage apparatus 200 to be written to the external volume (S115). The external storage apparatus 200 reports write-complete to the main storage apparatus 100 after storing the write data in cache memory (S116). When the main storage apparatus 100 confirms write-complete by the external storage apparatus 200, it reports write-complete to the host 10 (S117).

Thus, in the synchronous transfer mode, response time δ2 becomes long because write-complete is reported to the host 10 after waiting for processing by the external storage apparatus 200. The response time δ2 of the synchronous transfer mode is longer than the response time δ1 of the asynchronous transfer mode ($\delta2 \geq \delta1$).

As explained in detail hereinabove, in accordance with this embodiment, ease-of-use is enhanced such that, even under a heterogeneous environment in which a variety of storage apparatus 100, 200, 201, 202 are distributed and deployed on sub-networks 400, 401, 402, a user can easily search out an external volume to use.

Further, the information of various storage apparatuses distributed on a wide-area network can be managed inside the main storage apparatus 100 in an integrated fashion. Then, the main storage apparatus 100 can incorporate an external volume selected by a user, and provide in to a host 10 just as if it were one of its own internal volumes.

Thus, in this embodiment, data input/output can be carried out to an external volume while using the various functions of the main storage apparatus 100, making possible the effective utilization of storage system resources. In addition to the remote copying function described above, a data migration function, and a LUN security function can be cited as the various functions of the main storage apparatus 100. The data migration function is a function for migrating a volume in accordance with the data usage state. In this embodiment, for example, it is possible to carry out volume migration among a plurality of external volumes associated to a V-VOL 163. Thus, for example, a volume that is used infrequently can be migrated to the storage area of a less expensive storage device. The LUN security function is a function for controlling access to a volume from a host 10. A host 10 is only able to access prescribed volumes.

Further, in this embodiment, because a query command can be issued in accordance with the desired conditions of a user, the external resource management database T3 can be generated without delay as needed, and an external resource matching the user's desired conditions can be extracted in a relatively short period of time.

2. Second Embodiment

A second embodiment of the present invention will be explained based on FIG. 19 and FIG. 20. The following embodiment comprising this embodiment corresponds to a variation of the first embodiment described hereinabove. In this embodiment, the constitution is such that it can support a plurality of main storage apparatuses 100 existing on a network.

Figure 19:
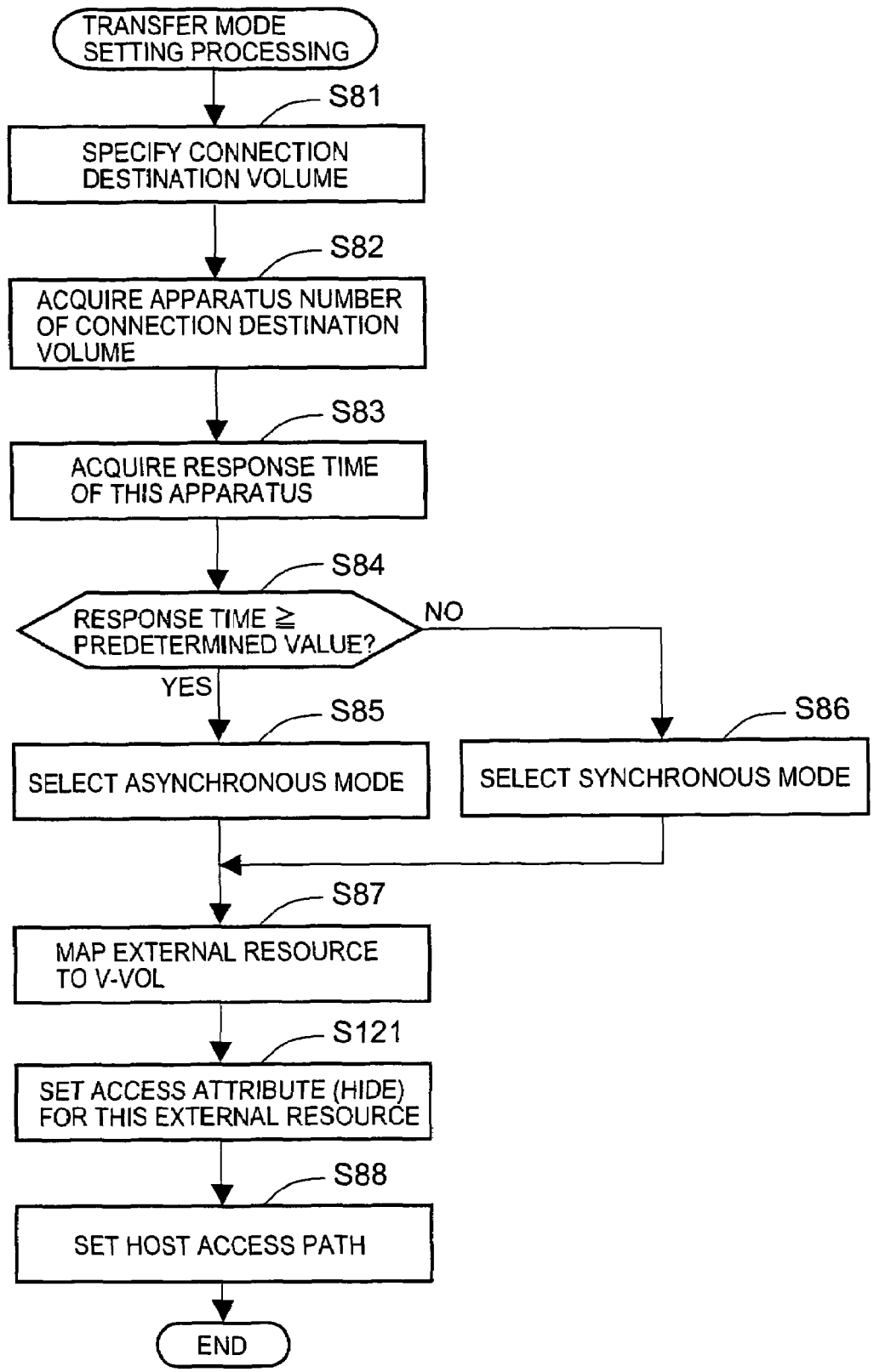
FIG. 19 is a flowchart showing another example of transfer mode setting processing.

FIG. 19 is a flowchart showing transfer mode setting processing in accordance with this embodiment. This processing comprises all of steps S81 through S88 shown in FIG. 16.

When a plurality of main storage apparatuses 100 exist on a wide-area network, if an external volume, which one of the main storage apparatus 100 is already using, can simultaneously be used by another main storage apparatus, data inconsistencies will occur. Accordingly, in this embodiment, when one main storage apparatus 100 connects to a V-VOL 163 and commences using an external volume (S87), a prescribed access attribute is set for this external volume (S88), making it impossible for another main storage apparatus to use it.

As a prescribed access attribute, "Hide" can be cited. Even when an Inquiry command or other such query command is input, an external volume, which is set to the "Hide" mode, will not respond to this command.

Figure 20:
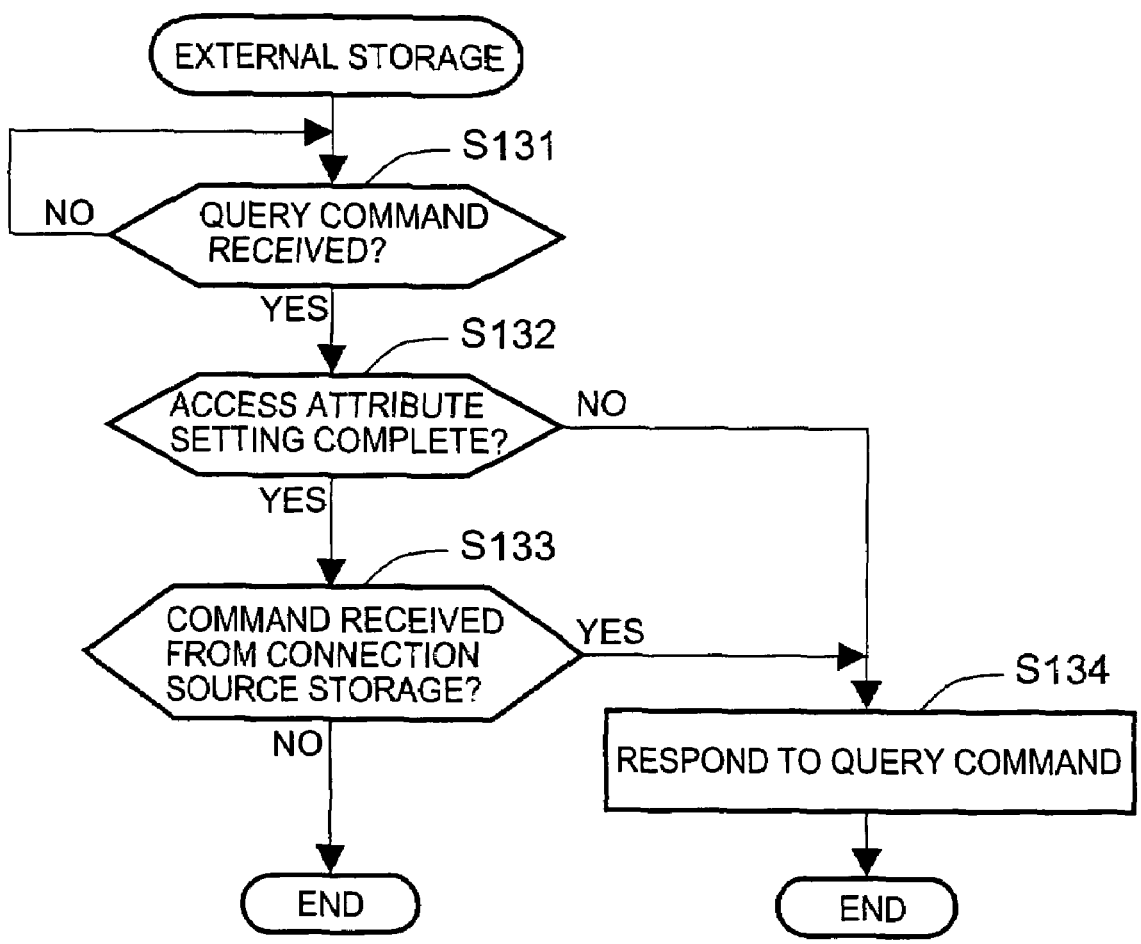
FIG. 20 is a flowchart showing processing when an external storage apparatus receives a query command.

FIG. 20 is a flowchart showing external storage apparatus processing. When an external storage apparatus receives a query command (S131: YES), it makes a determination as to whether or not an access attribute (For example, "Hide") is set in the external volume for which the query is intended (S132).

When an access attribute for not responding to a query command is set (S132: YES), the external storage apparatus determines whether or not this query command was issued from the main storage apparatus 100 of the connection source (S133). That is, it determines whether or not it is a query command from the main storage apparatus 100, which set the access attribute in this external volume.

When it is a query command from a main storage apparatus 100, which did not set the access attribute (S133: NO), the external storage apparatus can ignore the query command to this external volume.

By contrast, when it is a query command from the main storage apparatus 100, which set this access attribute (S133: YES), or when an access attribute has not been set in this external volume (S132: NO), the external storage apparatus responds to this query command, and sends the prescribed information (S134).

Furthermore, access attributes for preventing utilization by other main storage apparatus are not limited to "Hide." For example, the attribute "Capacity 0" can also be used. "Capacity 0" is an attribute, which responds to a "Read Capacity" command to the effect that there is absolutely no free space. An external volume, which has no free space, will not be utilized by other main storage apparatus.

Thus, in this embodiment, the main storage apparatus, which commenced utilizing this external volume beforehand can continue as-is to make exclusive use of it. Therefore, even when a plurality of main storage apparatuses exist on a wide-area network, it is possible to prevent data inconsistencies from occurring, and to further enhance ease-of-use.

3. Third Embodiment

A third embodiment will be explained on the basis of FIG. 21. This embodiment shows a specific example of the processing described in FIG. 13.

Figure 21:
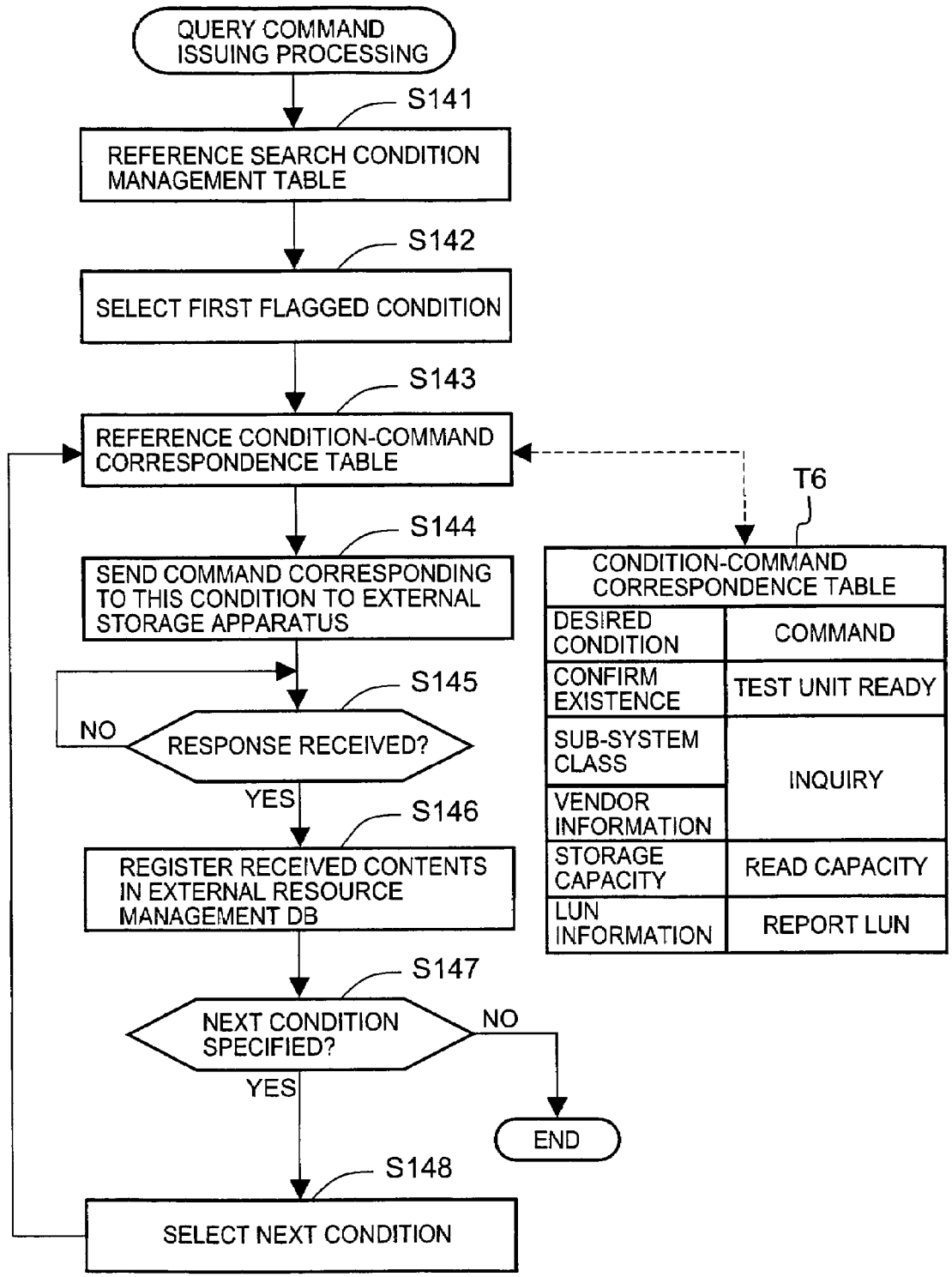
FIG. 21 is a flowchart showing processing for issuing a query command corresponding to a user-specified condition, and generating an external resource management database.

FIG. 21 is a flowchart showing processing for issuing a query command to external storage apparatus for constructing an external resource management database T3.

The main storage apparatus 100 references the search condition management table T1 (S141), and selects the first flagged condition (S142). The main storage apparatus 100 references a condition-command correspondence table T6 (S143), and sends a query command corresponding to the selected condition to external storage apparatus (S144).

A condition-command correspondence table T6, as shown in FIG. 21, is a table that corresponds user-specifiable conditions to commands used to acquire information related to those conditions.

The main storage apparatus 100 waits for responses from the respective external storage apparatus (S145), and when there are responses from the external storage apparatus (S145: YES), it registers the information acquired from the external storage apparatus in the external resource management database T3 (S146).

Then, the main storage apparatus 100 determines whether or not the next condition has been specified (S147). When the next condition has been specified (S147: YES), the main storage apparatus 100 selects this condition (S148), and returns to step S143.

Thus, for each condition specified by a user, a query command corresponding to that condition is sent to the respective external storage apparatus. Therefore, a query command unrelated to a user-specified condition, at least at this point in time, is not sent to the external storage apparatus. Furthermore, a constitution, which initially analyzes the entire search condition management table T1, and extracts all the required query commands prior to sending a query command, can also be used.

Furthermore, the present invention is not limited to the above embodiments. It will be understood by those skilled in the art that various additions and modifications can be made without departing from the scope of the present invention.

What is claimed is:

1. A storage apparatus capable of being connected to a plurality of other storage apparatuses, respectively, via a communications network, said storage apparatus comprising:
   a storage information manager for managing storage information related to said respective other storage apparatus;
   an intermediate volume, which is connected to a logical volume;
   an extractor for extracting, based on an input extraction condition, a prescribed storage apparatus matching said extraction condition from among said respective other storage apparatus by searching said storage information managed by said storage information manager;
   a presentation portion for showing said prescribed storage apparatus extracted by said extractor; and
   a connection controller for connecting a storage device of said prescribed storage apparatus to said intermediate volume, and connecting said intermediate volume to said logical volume when said prescribed storage apparatus shown by said presentation portion is selected,
   wherein, when said extraction condition has been input, said storage information manager determines whether or not acquisition of said storage information is complete, and when it is determined that said storage information has not been acquired, said storage information manager acquires and manages said storage information respectively from said other storage apparatus by issuing a query command to said respective other storage apparatus.

2. The storage apparatus according to claim 1, wherein said communications network comprises a plurality of sub-networks, said storage apparatus is disposed on any one of these sub-networks, and at least one of said other storage apparatuses is disposed on each of the other sub-networks.

3. The storage apparatus according to claim 1, wherein, when detecting a configuration change of said other storage apparatus, said storage information manager acquires storage information from the other storage apparatus involved in said configuration change by issuing a query command to the other storage apparatus involved in this configuration change.

4. The storage apparatus in accordance with claim 1, said storage information manager can detect and manage respectively a response state of said other storage apparatus relative to said query command.

5. The storage apparatus in accordance with claim 1, wherein said storage information manager can issue said query command in accordance with said extraction condition.

6. The storage apparatus according to claim 1, wherein said extraction condition comprises any one or more attributes from among a plurality of attributes of said other storage apparatus.

7. The storage apparatus according to claim 1, wherein said extraction condition comprises any one or more of class type to which said other storage apparatus belongs; type of storage device of said other storage apparatus; vendor name of said other storage apparatus; and free space of said other storage apparatus.

8. The storage apparatus according to claim 1, wherein, when a plurality of said prescribed storage apparatuses are detected, said presentation portion presents all of them.

9. The storage apparatus according to claim 1, wherein said connection controller connects said storage device and said logical volume via said intermediate volume so as to allocate the physical storage area of said storage device to said logical volume via said intermediate volume.

10. The storage apparatus according to claim 1, wherein said storage information manager can detect and manage a response state of said other storage apparatus relative to said query command, and
    wherein said connection controller controls a transfer mode between a storage device of said prescribed storage apparatus and said logical volume based on the response state of said other storage apparatus managed by said storage information manager.

11. The storage apparatus according to claim 1, wherein said connection controller prohibits the use of said storage device by said other storage apparatus when said storage device and said logical volume are connected via said intermediate volume.

12. A storage apparatus capable of being connected to a plurality of other storage apparatuses, respectively, via a communications network, said storage apparatus comprising:
    a storage information manager for managing storage information related to said respective other storage apparatus;
    an intermediate volume which is connected to a logical volume;
    an extractor for extracting, based on an input extraction condition, a prescribed storage apparatus matching said extraction condition from among said respective other storage apparatus by searching said storage information managed by said storage information manager;
    a presentation portion for showing said prescribed storage apparatus extracted by said extractor; and
    a connection controller for connecting a storage device of said prescribed storage apparatus to said intermediate volume, and connecting said intermediate volume to said logical volume when said prescribed storage apparatus shown by said presentation portion is selected,
    wherein said storage information manager can detect and manage the response state of said other storage apparatus relative to said query command,
    wherein said connection controller controls a transfer mode between a storage device of said prescribed storage apparatus and said logical volume based on a response state of said other storage apparatus managed by said storage information manager, and
    wherein said connection controller selects an asynchronous transfer mode when the response time from said selected prescribed storage apparatus is greater than a predetermined standard time, and selects a synchronous transfer mode when the response time from said selected prescribed storage apparatus is less than said predetermined standard time.

13. A method for managing a storage system, which comprises a plurality of types of storage apparatuses mixed together on a network, using a management function-equipped storage apparatus from among said storage apparatuses, wherein said management function-equipped storage apparatus executes the steps of:

receiving extraction condition input;

determining whether or not a database for managing the storage information of said respective storage apparatus has been generated when said extraction condition is input;

generating said database by acquiring said respective storage information from said respective storage apparatus by issuing a query command when said database has not been generated;

extracting a prescribed storage apparatus matching said extraction condition by searching said database based on said extraction condition;

presenting said extracted prescribed storage apparatus;

determining whether or not said presented prescribed storage apparatus has been selected;

logically connecting a storage device of said prescribed storage apparatus to a logical volume of said management function-equipped storage apparatus via an intermediate volume of said management function-equipped storage apparatus, when said prescribed storage apparatus has been selected; and updating said database when a configuration change of said respective storage apparatus is detected, by acquiring the storage information of a storage apparatus involved in this configuration change.

\* \* \* \* \*